United States Patent
Eaton et al.

(10) Patent No.: US 8,512,569 B2
(45) Date of Patent: Aug. 20, 2013

(54) FLUID FILTRATION ARTICLES AND METHODS OF MAKING AND USING THE SAME

(75) Inventors: Bradley W. Eaton, Woodbury, MN (US); Michael R. Berrigan, Oakdale, MN (US); William J. Feil, III, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 480 days.

(21) Appl. No.: 12/810,451

(22) PCT Filed: Dec. 15, 2008

(86) PCT No.: PCT/US2008/086766
§ 371 (c)(1),
(2), (4) Date: Jun. 24, 2010

(87) PCT Pub. No.: WO2009/088647
PCT Pub. Date: Jul. 16, 2009

(65) Prior Publication Data
US 2010/0282682 A1 Nov. 11, 2010

Related U.S. Application Data

(60) Provisional application No. 61/017,994, filed on Dec. 31, 2007.

(51) Int. Cl.
*B01D 61/00* (2006.01)
*B01D 29/46* (2006.01)
*B01D 29/07* (2006.01)
*D04H 1/00* (2006.01)
*D04H 1/56* (2006.01)

(52) U.S. Cl.
USPC ........ 210/650; 210/491; 210/508; 210/493.1; 442/351; 442/400; 442/417; 502/435

(58) Field of Classification Search
USPC ................ 210/505–508, 483, 488, 490, 491, 210/493.1, 435, 650; 428/299, 221, 409; 442/417, 439, 284, 400, 401, 408, 330, 351; 502/439
See application file for complete search history.

(56) References Cited

U.S. PATENT DOCUMENTS 1,975,504 A    10/1934    Formhals
3,323,963 A *    6/1967    Summers ...................... 156/192
(Continued)

FOREIGN PATENT DOCUMENTS
DE      199 29 709      12/2000
DE    10 2004 046 669      3/2006
(Continued)

OTHER PUBLICATIONS

Spunbond definition, Complete Textile Glossary, Celanese Acetate, © 2001.

*Primary Examiner* — Ana Fortuna
(74) *Attorney, Agent, or Firm* — James A. Baker

(57) ABSTRACT

Fluid filtration articles, including composite nonwoven fibrous webs, and methods of making and using such articles as gas or liquid filtration elements. The articles include a population of coarse microfibers having a population median diameter of at least 1 micrometer (μm) formed as a first layer, and a population of fine fibers having a population median diameter less than 10 μm formed as a second layer adjoining the first layer. At least one of the fiber populations may be oriented. In one implementation, the coarse microfibers and fine fibers are polymeric, the coarse microfibers have a population median diameter of at least 10 μm, and the fine fibers have a population median diameter less than 10 μm. In another implementation, the population of fine fibers has a population median diameter less than 1 μm. Optionally, one or both of the first and second layers may include particulates.

28 Claims, 4 Drawing Sheets

(56) References Cited

U.S. PATENT DOCUMENTS

| | | | |
|---|---|---|---|
| 3,874,886 | A | 4/1975 | Levecque et al. |
| 4,118,531 | A | 10/1978 | Hauser |
| 4,127,706 | A | 11/1978 | Martin et al. |
| 4,363,646 | A | 12/1982 | Torobin |
| 4,536,361 | A | 8/1985 | Torobin |
| 4,666,763 | A | 5/1987 | King et al. |
| 4,729,371 | A | 3/1988 | Krueger et al. |
| 4,818,585 | A * | 4/1989 | Shipp, Jr. .................. 428/198 |
| 4,886,527 | A * | 12/1989 | Fottinger et al. ............. 95/78 |
| 4,910,064 | A * | 3/1990 | Sabee ...................... 428/113 |
| 5,227,107 | A | 7/1993 | Dickenson et al. |
| 5,306,534 | A * | 4/1994 | Bosses ................... 428/35.2 |
| 5,332,426 | A | 7/1994 | Tang et al. |
| 5,415,779 | A | 5/1995 | Markell et al. |
| 5,496,507 | A | 3/1996 | Angadjivand et al. |
| 5,605,746 | A | 2/1997 | Groeger et al. |
| 5,763,078 | A * | 6/1998 | Braun et al. .............. 428/175 |
| 5,855,788 | A | 1/1999 | Everhart et al. |
| 5,871,836 | A | 2/1999 | Schultink et al. |
| 6,057,256 | A | 5/2000 | Krueger et al. |
| 6,114,017 | A | 9/2000 | Fabbricante et al. |
| 6,139,308 | A | 10/2000 | Berrigan et al. |
| 6,183,670 | B1 | 2/2001 | Torobin et al. |
| 6,269,513 | B1 | 8/2001 | Torobin |
| 6,315,806 | B1 | 11/2001 | Torobin et al. |
| 6,382,526 | B1 | 5/2002 | Reneker et al. |
| 6,494,974 | B2 | 12/2002 | Riddell |
| 6,550,622 | B2 | 4/2003 | Koslow |
| 6,607,624 | B2 | 8/2003 | Berrigan et al. |
| 6,743,273 | B2 * | 6/2004 | Chung et al. ............... 55/482 |
| 6,800,226 | B1 | 10/2004 | Gerking |
| 6,824,372 | B2 | 11/2004 | Berrigan et al. |
| 6,861,025 | B2 | 3/2005 | Erickson et al. |
| 6,872,311 | B2 | 3/2005 | Koslow |
| 7,947,142 | B2 * | 5/2011 | Fox et al. .................. 156/167 |
| 2001/0003082 | A1 | 6/2001 | kahlbaugh et al. |
| 2002/0034624 | A1 | 3/2002 | Harpell et al. |
| 2003/0203696 | A1 * | 10/2003 | Healey ..................... 442/382 |
| 2004/0035095 | A1 | 2/2004 | Healey |
| 2004/0092185 | A1 | 5/2004 | Grafe et al. |
| 2004/0097155 | A1 | 5/2004 | Olson et al. |
| 2005/0061728 | A1 | 3/2005 | Sprenger |
| 2005/0079379 | A1 | 4/2005 | Wadsworth et al. |
| 2005/0090173 | A1 | 4/2005 | Weisman |
| 2005/0266760 | A1 * | 12/2005 | Chhabra et al. ............. 442/417 |
| 2005/0287891 | A1 | 12/2005 | Park |
| 2006/0096910 | A1 | 5/2006 | Brownstein et al. |
| 2006/0096911 | A1 | 5/2006 | Brey et al. |
| 2006/0137317 | A1 | 6/2006 | Bryner et al. |
| 2007/0062887 | A1 | 3/2007 | Schwandt et al. |
| 2007/0175817 | A1 | 8/2007 | Goldman |
| 2007/0202766 | A1 | 8/2007 | Ouellette et al. |
| 2008/0026659 | A1 | 1/2008 | Brandner et al. |
| 2008/0038976 | A1 | 2/2008 | Berrigan et al. |
| 2008/0110822 | A1 * | 5/2008 | Chung et al. ............... 210/505 |
| 2010/0282682 | A1 * | 11/2010 | Eaton et al. ............... 210/650 |
| 2010/0291213 | A1 | 11/2010 | Berrigan et al. ............ 424/484 |
| 2011/0139706 | A1 * | 6/2011 | Kalayci et al. ............. 210/490 |
| 2012/0149273 | A1 * | 6/2012 | Moore et al. ............... 442/400 |

FOREIGN PATENT DOCUMENTS

| | | |
|---|---|---|
| JP | 2006-289209 | 10/2006 |
| WO | WO 93/06924 | 4/1993 |
| WO | WO 00/12194 | 3/2000 |
| WO | WO 00/29658 | 5/2000 |
| WO | WO 2004/046443 | 6/2004 |
| WO | WO 2006/089063 A2 | 8/2006 |
| WO | WO 2007/001990 | 1/2007 |
| WO | WO 2008/085545 | 7/2008 |

* cited by examiner

- ◆ Ex 13
- ⊟ Ex 14
- ◆ Ex 15
- ⊟ Ex 16

FLUID FILTRATION ARTICLES AND METHODS OF MAKING AND USING THE SAME

CROSS REFERENCE TO RELATED APPLICATION

This application is a 371 of PCT/US/2008/086766, filed on Dec. 15, 2008, which claims the benefit of U.S. Provisional Patent Application No. 61/017,994, filed Dec. 31, 2007, the disclosure of which is incorporated by reference herein in its entirety.

TECHNICAL FIELD

The present disclosure relates to fluid filtration articles and methods of making and using such articles. The disclosure further relates to composite nonwoven fibrous webs including fine fibers, such as sub-micrometer fibers and microfibers, useful in fluid filtration articles.

BACKGROUND

Numerous types of fluid filtration systems, e.g. such as those used for home water filtration and respirators, are commercially available. Nonwoven fibrous webs are frequently used as a filtration medium in such fluid filtration systems. Such nonwoven fibrous webs may include two or more kinds of fibers, for example, two different populations of microfibers, each having a different average diameter, so that the nonwoven fibrous web can filter particles of a broad range of sizes. Generally the different populations of fibers are intermixed within a single-layer web.

One example of a multi-layer nonwoven fibrous web useful as a filtration medium is described in U.S. Patent Application Publication No. US 2004/0035095 (Healey). Another example of a multi-layer nonwoven fibrous web is provided by so-called SMS (Spunbond-Meltblown-Spunbond) webs comprising a layer of spunbond fibers, a layer of meltblown microfibers, and another layer of spunbond fibers. In some nonwoven fibrous webs useful as a filtration medium, it has been found to be advantageous to incorporate sorbent particulates, such as activated carbon, within the web.

SUMMARY

There is an ongoing need to provide compact fluid filtration systems, for example, water filtration systems for home use. It is further desirable to minimize degradation of or damage to nonwoven fibrous webs useful as filtration media during processing to form fluid filtration articles. There is also a need to provide fluid filtration articles that have high loadings of active particulates, such as absorbent and/or adsorbent particulates, without increasing pressure drop across the water filtration system. It is also desirable to provide particulate-loaded nonwoven fibrous webs which effectively retain the particulates within the fiber matrix, thereby preventing release of particles into the permeating fluid. In addition, there is a continuing need to provide fluid filtration articles having improved service life and filtration effectiveness.

In one aspect, the disclosure relates to an article in the form of a composite nonwoven fibrous web comprising a population of coarse microfibers having a population median diameter of at least 1 micrometer ($\mu$m) formed as a first layer, and a population of fine fibers having a population median diameter less than 10 $\mu$m formed as a second layer adjoining the first layer. At least one of the fiber populations may be oriented.

In one exemplary embodiment, the coarse microfibers and fine fibers are polymeric, the coarse microfiber population has a population median diameter of at least 1 $\mu$m, and the fine fiber population has a population median diameter less than 10 $\mu$m. In another exemplary embodiment, the population of fine fibers has a population median diameter less than 1 $\mu$m. At least one of the fiber populations may be oriented. In certain embodiments, one or both of the first and second layers comprises a plurality of particulates.

In another aspect, the disclosure relates to a fluid filtration medium comprising a composite nonwoven fibrous web further comprising a population of microfibers having a median diameter of at least 1 $\mu$m formed as a first layer, and a population of sub-micrometer fibers having a median diameter less than one micrometer ($\mu$m) formed as a second layer adjoining the first layer. At least one of the fiber populations may be oriented. In certain exemplary embodiments, at least the first layer comprises a plurality of particulates, which may be sorbent particulates.

In an additional aspect, the disclosure relates to a method of using the fluid filtration media as described above, comprising passing a permeating fluid through the first and second layers, wherein the permeating fluid passes through the first layer before passing through the second layer. In other exemplary embodiments, the second layer is pleated, and the permeating fluid passes through the second layer before passing through the first layer.

In a further aspect, the disclosure relates to a method of making a fluid filtration medium comprising a composite nonwoven fibrous web, comprising forming a first layer comprising a population of coarse polymeric microfibers having a population median fiber diameter of at least 1 $\mu$m, forming a second layer comprising a population of fine polymeric microfibers having a population median fiber diameter of less than 10 $\mu$m, orienting one or both of the first and second layer, and bonding the first layer to the second layer. In certain exemplary embodiments, one or both of the first and second layers comprises a plurality of particulates.

In yet another aspect, the disclosure relates to a method of making a fluid filtration medium comprising a composite nonwoven fibrous web further comprising forming a first layer comprising a population of microfibers having a median fiber diameter of at least 1 $\mu$m, and forming a second layer impinging on the first layer, the second layer including a population of sub-micrometer fibers having a median fiber diameter of less than 1 $\mu$m, wherein at least one of the fiber populations may be oriented. In certain exemplary embodiments, at least the first layer comprises a plurality of particulates, which may be sorbent particulates.

In a further aspect, the disclosure relates to a fluid filtration article comprising a population of microfibers having a population median diameter of at least 1 $\mu$m formed as a first layer; a population of sub-micrometer fibers having a population median diameter less than one micrometer ($\mu$m) formed as a second layer adjoining the first layer; and a fluid-impermeable housing surrounding the first and second layers, wherein the housing comprises at least one fluid inlet in fluid communication with the first layer, and at least one fluid outlet in fluid communication with the second layer. In some exemplary embodiments, the fluid may be a liquid, for example, water. In other exemplary embodiments, the fluid may be a gas, for example, air.

Various aspects and advantages of exemplary embodiments of the disclosure have been summarized. The above Summary is not intended to describe each illustrated embodiment or every implementation of the present invention. The Drawings and the Detailed Description that follow more particularly exemplify certain preferred embodiments using the principles disclosed herein.

BRIEF DESCRIPTION OF THE DRAWINGS

Exemplary embodiments of the present disclosure are further described with reference to the appended figures, wherein.

DETAILED DESCRIPTION

Glossary

Figure 1A:
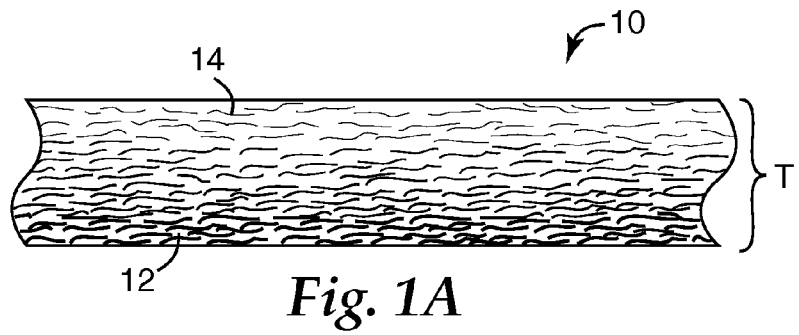
FIG. 1A is a schematic illustration of an exemplary porous composite nonwoven fibrous web for producing a fluid filtration medium.

As used herein:

"Microfibers means fibers having a median diameter of at least one micrometer (μm).

"Coarse microfibers" means microfibers having a median diameter of at least 10 μm.

"Fine microfibers" means microfibers having a median diameter of less than 10 μm.

"Ultrafine microfibers" means microfibers having a median diameter of 2 μm or less.

"Sub-micrometer fibers" means fibers having a median diameter of less than 1 μm.

When reference is made herein to a batch, group, array, etc. of a particular kind of microfiber, e.g., "an array of sub-micrometer fibers," it means the complete population of microfibers in that array, or the complete population of a single batch of microfibers, and not only that portion of the array or batch that is of sub-micrometer dimensions.

"Continuous oriented microfibers" means essentially continuous fibers issuing from a die and traveling through a processing station in which the fibers are permanently drawn and at least portions of the polymer molecules within the fibers are permanently oriented into alignment with the longitudinal axis of the fibers ("oriented" as used with respect to fibers means that at least portions of the polymer molecules of the fibers are aligned along the longitudinal axis of the fibers).

"Meltblown fibers" means fibers prepared by extruding molten fiber-forming material through orifices in a die into a high-velocity gaseous stream, where the extruded material is first attenuated and then solidifies as a mass of fibers.

"Separately prepared microfibers" means a stream of microfibers produced from a microfiber-forming apparatus (e.g., a die) positioned such that the microfiber stream is initially spatially separate (e.g., over a distance of about 1 inch (25 mm) or more from, but will merge in flight and disperse into, a stream of larger size microfibers.

"Nonwoven web" means a fibrous web characterized by entanglement or point bonding of the fibers.

"Self-supporting" means a web having sufficient coherency and strength so as to be drapable and handleable without substantial tearing or rupture.

"Web basis weight" is calculated from the weight of a 10 cm×10 cm web sample.

"Web thickness" is measured on a 10 cm×10 cm web sample using a thickness testing gauge having a tester foot with dimensions of 5 cm×12.5 cm at an applied pressure of 150 Pa.

"Bulk density" is the mass per unit volume of the bulk polymer or polymer blend that makes up the web, taken from the literature.

"Effective Fiber Diameter" is the apparent diameter of the fibers in a fiber web based on an air permeation test in which air at 1 atmosphere and room temperature is passed through a web sample at a specified thickness and face velocity (typically 5.3 cm/sec), and the corresponding pressure drop is measured. Based on the measured pressure drop, the Effective Fiber Diameter is calculated as set forth in Davies, C. N., *The Separation of Airborne Dust and Particles,* Institution of Mechanical Engineers, London Proceedings, 1B (1952).

"Molecularly same polymer" means polymers that have essentially the same repeating molecular unit, but which may differ in molecular weight, method of manufacture, commercial form, and the like.

"Meltblowing" and "meltblown process" means a method for forming a nonwoven web by extruding a fiber-forming material through a plurality of orifices to form filaments while contacting the filaments with air or other attenuating fluid to attenuate the filaments into fibers and thereafter collecting a layer of the attenuated fibers.

"Attenuating the filaments into fibers" means the conversion of a segment of a filament into a segment of greater length and smaller diameter.

"Spunbonding" and "spun bond process" means a method for forming a nonwoven web by extruding a low viscosity melt through a plurality of orifices to form filaments, quenching the filaments with air or other fluid to solidify at least the surfaces of the filaments, contacting the at least partially solidified filaments with air or other fluid to attenuate the filaments into fibers and collecting and optionally calendering a layer of the attenuated fibers.

"Spun bond fibers" means fibers made using a spun bond process. Such fibers are generally continuous and are entangled or point bonded sufficiently that it is usually not possible to remove one complete spun bond fiber from a mass of such fibers.

"Die" means a processing assembly for use in polymer melt processing and fiber extrusion processes, including but not limited to meltblowing and the spunbonding processes.

"Particle" and "particulate" are used substantially interchangeably. Generally, a particle or particulate means a small distinct piece or individual part of a material in finely divided form. However, a particulate may also include a collection of individual particles associated or clustered together in finely divided form. Thus, individual particles used in certain exemplary embodiments of the present disclosure may clump, physically intermesh, electro-statically associate, or otherwise associate to form particulates. In certain instances, particulates in the form of agglomerates of individual particles may be intentionally formed such as those described in U.S. Pat. No. 5,332,426 (Tang et al.).

"Particle-loaded meltblown media" or "composite nonwoven fibrous web" means a nonwoven web having an open-structured entangled mass of fibers, for example, sub-micrometer fibers and optionally microfibers, containing particles enmeshed among the fibers, the particles optionally being absorbent and/or adsorbent.

"Enmeshed" means that particles are dispersed and physically held in the fibers of the web. Generally, there is point and line contact along the fibers and the particles so that nearly the full surface area of the particles is available for interaction with a fluid.

"Autogenous bonding" means bonding between fibers at an elevated temperature as obtained in an oven or with a through-air bonder without application of solid contact pressure such as in point-bonding or calendering.

"Calendering" means a process of passing a product, such as a polymeric absorbent loaded web through rollers to obtain a compressed material. The rollers may optionally be heated.

"Densification" means a process whereby fibers which have been deposited either directly or indirectly onto a filter winding arbor or mandrel are compressed, either before or after the deposition, and made to form an area, generally or locally, of lower porosity, whether by design or as an artifact of some process of handling the forming or formed filter. Densification also includes the process of calendering webs.

"Fluid treatment unit," "fluid filtration article," or "fluid filtration system" means an article containing a fluid filtration medium, such as a porous composite nonwoven fibrous web. These articles typically include a filter housing for a fluid filtration medium and an outlet to pass treated fluid away from the filter housing in an appropriate manner. The term "fluid filtration system" also includes any related method of separating raw fluid, such as untreated gas or liquid, from treated fluid.

"Void volume" means a percentage or fractional value for the unfilled space within a porous body such as a filter, calculated by measuring the weight and volume of a filter, then comparing the filter weight to the theoretical weight a solid mass of the same constituent material of that same volume.

"Porosity" means a measure of void spaces in a material. Size, frequency, number, and/or interconnectivity of pores and voids contribute the porosity of a material.

"Layer" means a single stratum formed between two major surfaces. A layer may exist internally within a single web, e.g., a single stratum formed with multiple strata in a single web have first and second major surfaces defining the thickness of the web. A layer may also exist in a composite article comprising multiple webs, e.g., a single stratum in a first web having first and second major surfaces defining the thickness of the web, when that web is overlaid or underlaid by a second web having first and second major surfaces defining the thickness of the second web, in which case each of the first and second webs forms at least one layer. In addition, layers may simultaneously exist within a single web and between that web and one or more other webs, each web forming a layer.

"Adjoining" with reference to a particular first layer means joined with or attached to another, second layer, in a position wherein the first and second layers are either next to (i.e., adjacent to) and directly contacting each other, or contiguous with each other but not in direct contact (i.e., there are one or more additional layers intervening between the first and second layers).

"Particulate density gradient," "sorbent density gradient," and "fiber population density gradient" mean that the amount of particulate, sorbent or fibrous material within a particular fiber population (e.g., the number, weight or volume of a given material per unit volume over a defined area of the web) need not be uniform throughout the composite nonwoven fibrous web, and that it can vary to provide more material in certain areas of the web and less in other areas.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but is to be controlled by the limitations set forth in the claims and any equivalents thereof.

A. Composite Nonwoven Fibrous Webs (Fluid Filtration Media and Articles)

In one aspect, the disclosure provides an article in the form of a composite nonwoven fibrous web comprising a population of microfibers or coarse microfibers having a population median diameter of at least 1 micrometer ($\mu$m) formed as a first layer, and a population of fine fibers having a population median diameter less than 10 $\mu$m formed as a second layer adjoining the first layer. At least one of the fiber populations may be oriented.

In one exemplary embodiment, the coarse microfibers and fine fibers are polymeric, the microfiber or coarse microfiber population has a population median diameter of at least 1 $\mu$m, and the fine fiber population has a population median diameter less than 10 $\mu$m. In another exemplary embodiment, the population of fine fibers has a population median diameter less than 1 $\mu$m. At least one of the fiber populations may be oriented. In certain embodiments, one or both of the first and second layers comprises a plurality of particulates.

In another aspect, the disclosure provides a fluid filtration medium in the form of a composite nonwoven fibrous web further comprising a population of microfibers having a median diameter of at least 1 $\mu$m formed as a first layer, and a population of sub-micrometer fibers having a median diameter less than one micrometer ($\mu$m) formed as a second layer adjoining the first layer. At least one of the fiber populations may be oriented. In certain exemplary embodiments, at least the first layer comprises a plurality of particulates, which may be sorbent particulates.

Oriented fibers are fibers where there is molecular orientation within the fiber. Fully oriented and partially oriented polymeric fibers are known and commercially available. Orientation of fibers can be measured in a number of ways, including birefringence, heat shrinkage, X-ray scattering, and elastic modulus (see e.g., *Principles of Polymer Processing,* Zehev Tadmor and Costas Gogos, John Wiley and Sons, New York, 1979, pp. 77-84). It is important to note that molecular orientation is distinct from crystallinity, as both crystalline and amorphous materials can exhibit molecular orientation independent from crystallization. Thus, even though commercially known sub-micrometer fibers made by melt-blowing or electrospinning are not oriented, there are known methods of imparting molecular orientation to fibers made using those processes. However, the process described by Torobin (see e.g., U.S. Pat. No. 4,536,361) has not been shown to produce molecularly oriented fibers.

Referring to FIG. 1A, a schematic of an exemplary composite nonwoven fibrous article for producing a fluid filtration medium according to an exemplary embodiment of the present disclosure is illustrated. The composite nonwoven fibrous web 10 comprises a first layer comprising a population of microfibers 12, overlaid by a second layer 14 which may comprise a population of fine microfibers, ultrafine microfibers, and/or sub-micrometer fibers. The population of microfibers 12 may be coarse microfibers. A gradient of fiber population median diameter from coarse to fine is shown across the thickness T of the web 10. However, it is to be understood that other gradients (not illustrated by the figures) may be used; for example, a gradient of fiber population median diameter from fine to coarse across the thickness of the web. In further exemplary embodiments, a gradient of particulate concentration and/or particulate size may be created across or through the thickness of one or both layers.

In additional embodiments, additional layers (not shown), including an optional support layer (not shown), may also be included in other exemplary embodiments. In an alternative embodiment (not shown), the first (e.g., microfiber) layer may overlay the second (e.g., fine fiber) layer.

Figure 1B:
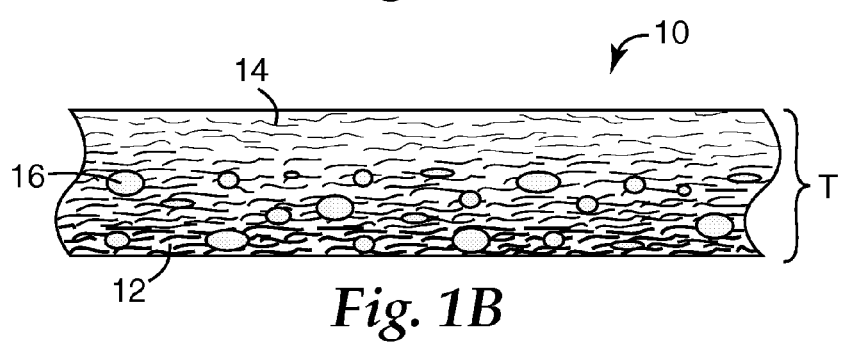
FIG. 1B is a schematic illustration of an exemplary porous, particle-loaded composite nonwoven fibrous web for producing a fluid filtration medium.

FIG. 1B is a schematic of another exemplary composite nonwoven fibrous article for producing a fluid filtration medium according to an exemplary embodiment of the present disclosure is illustrated. The composite nonwoven fibrous web 10 comprises a first layer comprising a population of microfibers 12, overlaid by a second layer which may comprise a population of fine microfibers, ultrafine microfibers, and/or sub-micrometer fibers. The population of microfibers 12 may be coarse microfibers. A plurality of particulates 16 is distributed among the microfibers 12 in the first layer. A gradient of fiber population median diameter from coarse to fine is shown across the thickness T of the web 10. In an alternative embodiment (not shown), the first (e.g., microfiber) layer may overlay the second (e.g., fine fiber) layer. Additional layers (not shown), including an optional support layer (not shown), may also be included in other exemplary embodiments.

Figure 2:
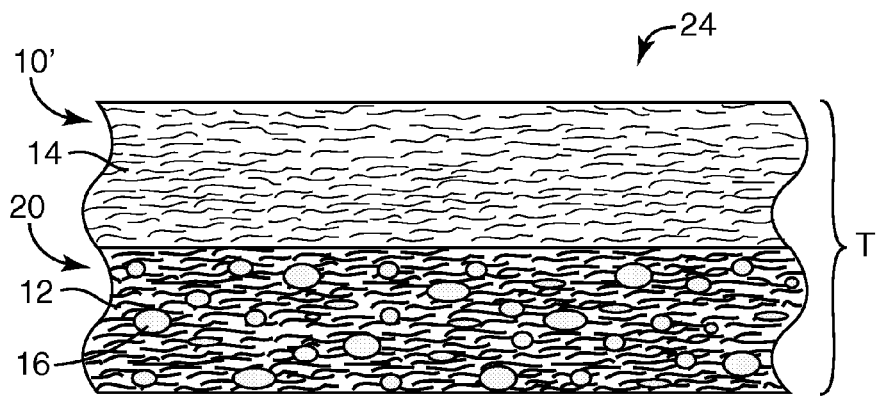
FIG. 2 is a schematic illustration of an exemplary porous composite nonwoven fibrous web stack for producing a fluid filtration medium.

FIG. 2 is a schematic of another exemplary composite nonwoven fibrous article for producing a fluid filtration medium or element according to an exemplary embodiment of the present disclosure is illustrated. The composite nonwoven fibrous element 24 comprises two webs overlaid to form two distinct layers. In the illustrated embodiment, a first layer 20, comprising a population of microfibers 12, is overlaid by a second layer 10', which may comprise a population of fine microfibers, ultrafine microfibers, and/or sub-micrometer fibers 14. The population of microfibers 12 may be coarse microfibers. A plurality of particulates 16 is distributed among the population of microfibers 12 in the first layer 20. In an alternative embodiment (not shown), the first (e.g., microfiber) layer 20 may overlay the second (e.g., fine fiber) layer 10'. In other embodiments (not shown), additional layers may be formed by additional overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the composite nonwoven fibrous article 10'.

In a further aspect, the disclosure relates to a fluid filtration article comprising a population of microfibers having a population median diameter of at least 1 μm formed as a first layer; a population of sub-micrometer fibers having a population median diameter less than one micrometer (μm) formed as a second layer adjoining the first layer; and a fluid-impermeable housing surrounding the first and second layers, wherein the housing comprises at least one fluid inlet in fluid communication with the first layer, and at least one fluid outlet in fluid communication with the second layer. In some exemplary embodiments, the fluid may be a liquid, for example, water. In other exemplary embodiments, the fluid may be a gas, for example, air.

Figure 3:
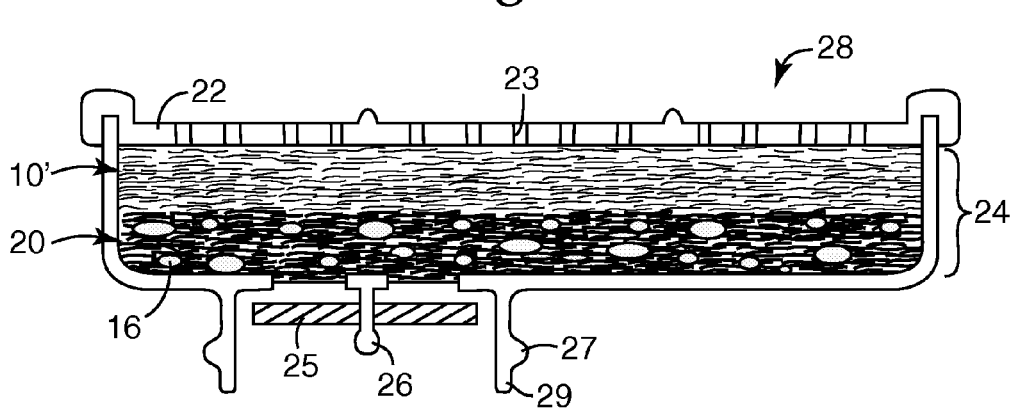
FIG. 3 is a schematic illustration of the exemplary porous composite nonwoven fibrous web stack of FIG. 2 used in an exemplary fluid filtration article.

FIG. 3 is a schematic illustration of the exemplary multilayer composite nonwoven fibrous web of FIG. 2 used in an exemplary stacked fluid filtration article 28, wherein the fluid is a gas such as, for example, air. While FIG. 3 is described in terms of gas filtration, it is to be understood that other fluids, for example liquids (e.g., water), may be used.

FIG. 3 shows a cross-sectional view of the exemplary fluid (e.g., gas) filtration article 28, which may be useful as, for example, a respirator. As illustrated in FIG. 3, exemplary fluid (e.g., gas) filtration article 28 uses the composite nonwoven fibrous element 24 shown in FIG. 2 in a stacked configuration. Composite nonwoven fibrous element 24 comprises two webs overlaid to form two distinct layers.

In the illustrated embodiment, a first layer 20, comprising a population of microfibers (12 in FIG. 2), is overlaid and adjoined by a second layer 10', which may comprise a population of fine microfibers, ultrafine microfibers, and/or sub-micrometer fibers (14 in FIG. 2). The population of microfibers (12 in FIG. 2) may be coarse microfibers. A plurality of particulates 16 is distributed in the first layer 20. In an alternative embodiment (not shown), the first (e.g., microfiber) layer 20 may overlay and adjoin the second (e.g., fine fiber) layer 10'. In other embodiments (not shown), additional layers may be formed by additional adjoining overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the composite nonwoven fibrous element 24.

The interior of exemplary fluid (e.g., gas) filtration article 28 can be at least partially filled with the composite nonwoven fibrous element 24. Housing 29, including perforated cover 22, surrounds composite nonwoven fibrous element 24. The housing 29 includes at least one fluid inlet 23 in fluid communication with the first layer 20, and at least one fluid outlet 25 in fluid communication with the second layer 10'. For example, as shown in FIG. 3, fluid (e.g., ambient air) enters filtration article 28 through fluid (e.g., gas) inlet openings 23 in perforated cover 22 of housing 29, passes through composite nonwoven fibrous element 24 (whereupon potentially hazardous substances in such fluid may be absorbed and/or adsorbed by particulates 16 distributed in first layer 20) and exits fluid (e.g., gas) filtration article 28 through fluid outlet opening 25 (e.g., air valve 25 mounted on support 26 of housing 29. Flange 27 enables fluid (e.g., gas) filtration article 28 to be replaceably attached to a fluid (e.g., gas) filtration device such as a respirator (not shown). Suitable respirators are known to those skilled in the art.

As illustrated in FIG. 3, the exemplary fluid (e.g., gas) filtration article 28 uses the composite nonwoven fibrous element 24 shown in FIG. 2. In alternative embodiments, other composite nonwoven fibrous articles, for example, those illustrated or described in the description of FIGS. 1A and 1B, may be used. In one alternative embodiment (not shown), the first (e.g., microfiber) layer 20 may overlay the second (e.g., fine fiber) layer 10'. In other embodiments (not shown), additional layers may be formed by additional overlaid or underlaid webs, or by forming a gradient of fiber population median diameter (e.g., from coarse to fine, fine to coarse, and the like), particulate population mean diameter (e.g., from coarse to fine, fine to coarse, and the like), and/or particulate concentration expressed, for example, as a mass of particulates per mass of fibers (e.g., from high to low concentration, low to high concentration) across the thickness T of the composite nonwoven fibrous element 10', as illustrated in FIGS. 1A and 1B. The additional layers (not shown) may include an optional support layer (not shown) as described herein.

Figure 4:
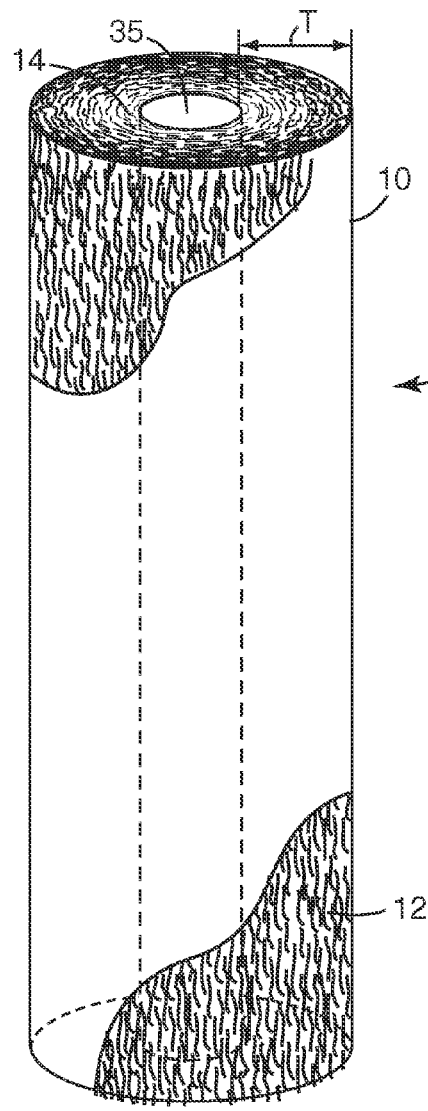
FIG. 4 is a cross-section of an exemplary cylindrically wound porous web stack useful in an exemplary fluid filtration article.

FIG. 4 is a cross-section of an exemplary cylindrically wound porous web useful in a cylindrical fluid filtration medium 30. The composite nonwoven fibrous web 10 of FIG. 1A has been wound to form a cylinder having a hollow core 35, the cylinder wound such that first microfiber layer 12, comprising a population of microfibers, forms an outer radial layer overlaid by second fine fiber layer 14, which may comprise a population of fine microfibers, ultrafine microfibers, and/or sub-micrometer fibers. The population of microfibers may be coarse microfibers. A gradient of fiber population median diameter from coarse to fine is shown across the thickness T of the web 10 in moving in the radial direction from the outer edge of the first microfiber layer 12 to the outer edge of the hollow core 35. In other embodiments (not shown in FIG. 4), a gradient of fiber population median diameter from fine to coarse in moving in the radial direction from the outer edge of the first microfiber layer to the outer edge of the hollow core may be used. In an alternative embodiment (not shown), the first (e.g., microfiber) layer may overlay the second (e.g., fine fiber) layer.

In further exemplary embodiments, one or both of the first layer and second layer may comprise a plurality of particulates (not shown in FIG. 4). The plurality of particulates may be distributed in one or both of the first microfiber layer and the second fine fiber layer so as to exhibit a gradient (not shown in FIG. 4) of particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the thickness T of the web 10 in the radial direction. Additional layers (not shown), including an optional support layer (not shown), may also be included in additional exemplary embodiments.

Figure 5:
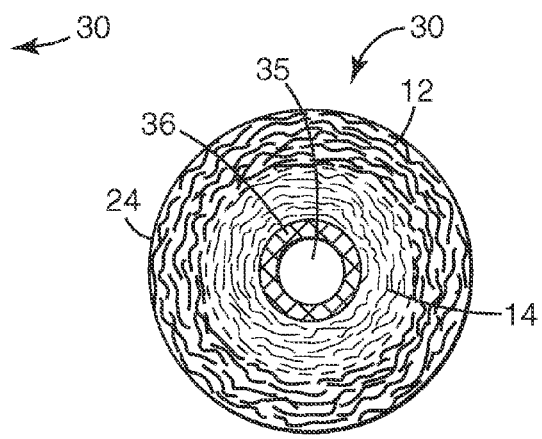
FIG. 5 is a cross-section end view of the exemplary cylindrically wound porous web stack according to FIG. 4, configured for use as an illustrative embodiment of a fluid filtration article.

FIG. 5 is a cross-section end view of an exemplary embodiment of a cylindrically wound porous web according to the concepts illustrated by FIG. 4, configured for use as an illustrative embodiment of a cylindrical fluid filtration medium 30. The composite nonwoven fibrous web 24 illustrated by FIG. 2, shown in FIG. 5 without the optional particulates (16 in FIG. 2), is shown wound into a cylinder around a porous cylindrical mesh layer 36 positioned within hollow core 35 adjoining second layer 14, comprising a population of fine microfibers, ultrafine microfibers, and/or sub-micrometer fibers. First layer 12, comprising a population of microfibers, forms an outer radial layer overlaid by second layer 14. The population of microfibers may be coarse microfibers. A gradient of fiber population median diameter from coarse to fine is shown across the web 10 in the radial direction. In an alternative embodiment (not shown), the first (e.g., microfiber) layer may overlay the second (e.g., fine fiber) layer. In other embodiments (not shown in FIG. 5), a gradient of fiber population median diameter from fine to coarse in moving in the radial direction from the outer edge of the first microfiber layer to the outer edge of the porous cylindrical mesh layer may be used. In an alternative embodiment (not shown), the first (e.g., microfiber) layer may overlay the second (e.g., fine fiber) layer.

In further exemplary embodiments, one or both of the first layer and second layer may comprise a plurality of particulates (not shown in FIG. 5). The plurality of particulates may be distributed in one or both of the first microfiber layer and the second fine fiber layer so as to exhibit a gradient (not shown in FIG. 5) of particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the web 10 in the radial direction. Additional layers (not shown), including an optional support layer (not shown), may also be included in additional exemplary embodiments.

Figure 6:
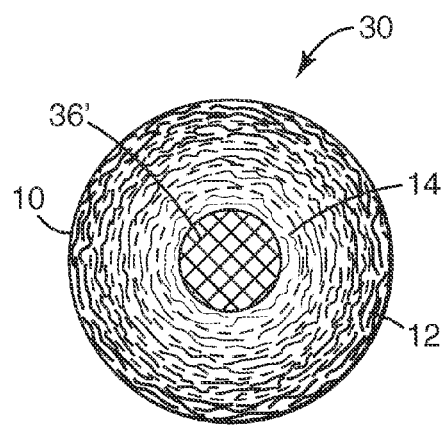
FIG. 6 is a cross-section end view of the exemplary cylindrically wound porous web stack according to FIG. 4, configured for use as another illustrative embodiment of a fluid filtration article.

FIG. 6 is a cross-section end view of the exemplary cylindrically wound porous web according to FIG. 4, configured for use as another illustrative embodiment of a cylindrical fluid filtration medium 30. The composite nonwoven fibrous web 10 of FIG. 1A is shown wound into a cylinder around a porous cylindrical core 36' positioned to fill the hollow core (not shown in FIG. 6) adjoining second layer 14, comprising a population of fine microfibers, ultrafine microfibers, and/or sub-micrometer fibers. First layer 12, comprising a population of microfibers, forms an outer radial layer overlaid by second layer 14. The population of microfibers may be coarse microfibers. A gradient of fiber population median diameter from coarse to fine is shown across the web 10 in the radial direction. In an alternative embodiment (not shown), the first (e.g., microfiber) layer may overlay the second (e.g., fine fiber) layer. In other embodiments (not shown in FIG. 6), a gradient of fiber population median diameter from fine to coarse in moving in the radial direction from the outer edge of the first microfiber layer to the outer edge of the porous cylindrical core may be used. In an alternative embodiment (not shown), the first (e.g., microfiber) layer may overlay the second (e.g., fine fiber) layer.

In further exemplary embodiments, one or both of the first layer and second layer may comprise a plurality of particulates (not shown in FIG. 6). The plurality of particulates may be distributed in one or both of the first microfiber layer and the second fine fiber layer so as to exhibit a gradient (not shown in FIG. 6) of particulate population mean diameter (e.g., from coarse to fine, fine to coarse, and the like), and/or particulate concentration expressed, for example, as a mass of particulates per mass of fibers (e.g., from high to low concentration, low to high concentration, and the like) across the web 10 in the radial direction. Additional layers (not shown), including an optional support layer (not shown), may also be included in additional exemplary embodiments.

Each of the exemplary cylindrical fluid filtration media 30 illustrated by FIGS. 4-6 may be used in a fluid filtration article comprising a fluid-impermeable housing (not shown in FIGS. 4-6) surrounding the first and second layers, wherein the housing comprises at least one fluid inlet (not shown in the figures) in fluid communication with the first microfiber layer (12 in FIGS. 4-6), and at least one fluid outlet (not shown in the figures, but generally connected to hollow core 35 in FIGS. 4-5 or porous cylindrical mesh layer 36 in FIG. 6) in fluid communication with the second fine fiber layer (14 in FIGS. 4-6). Such fluid impermeable housings are known in the art. In certain exemplary embodiments, the fluid may be selected to be a liquid, for example water.

In other exemplary embodiments not illustrated in the Figures, a multi-layer composite nonwoven fibrous web may be formed by overlaying on a support layer (e.g., a web) a composite nonwoven fibrous web comprising an overlayer of coarse microfibers on an underlayer comprising a population of fine microfibers, ultrafine microfibers, or sub-micrometer fibers, such that at least a portion of the fibers contacts the support layer at a major surface of the single-layer composite nonwoven fibrous web.

In additional exemplary embodiments not illustrated in the Figures, a composite nonwoven fibrous web may be formed by overlaying on a support layer (e.g., a web) a composite web comprising a population of sub-micrometer fibers intermixed with a population of microfibers to form an inhomogenous mixture of fibers on the support layer. In further embodiments, a multi-layer composite nonwoven fibrous web may be formed by overlaying on a support layer a single-layer composite web such that a major surface of the single-layer composite web contacts the support layer. Furthermore, a support layer may have additional layers and/or components (not shown) adjacent to or adjoining the support layer opposite the major surface of the single-layer composite web contacting the support layer.

In each of the preceding embodiments of a composite nonwoven fibrous web, it will be understood that the term "overlayer" is intended to describe the embodiments actually illustrated by FIGS. 2 and 3. However, by flipping any of the illustrated composite nonwoven fibrous webs 180 degrees about the interface between the layers, what has been described as an overlayer may become an underlayer, and the disclosure is intended to cover such modification to the illustrated embodiments. Furthermore, reference to "a layer" is intended to mean at least one layer, and therefore each illustrated embodiment of a multi-layer composite nonwoven fibrous web may include one or more additional layers (not shown) within the scope of the disclosure. Furthermore, reference to "a layer" is intended to describe a layer at least partially covering one or more additional layers (not shown).

For any of the exemplary embodiments of a composite nonwoven fibrous web according to the present disclosure, the single-layer composite nonwoven fibrous web will exhibit a basis weight, which may be varied depending upon the particular end use of the web. Typically, the single-layer composite nonwoven fibrous web has a basis weight of less than about 1000 grams per square meter (gsm). In some embodiments, the single-layer composite nonwoven fibrous web has a basis weight of from about 1.0 gsm to about 500 gsm. In other embodiments, the single-layer composite nonwoven fibrous web has a basis weight of from about 10 gsm to about 300 gsm.

In certain additional embodiments, the composite nonwoven fibrous web comprises a multi-layer construction including at least a first microfiber layer and a second layer comprising a population of fine microfibers, ultrafine microfibers, and/or sub-micrometer fibers. In some embodiments, the first microfiber layer has a basis weight of from about 1.0 gsm to about 500 gsm, more preferably from about 10 to about 300 gsm. In further embodiments, the second layer has a basis weight of from about 0.1 to about 200 gsm, more preferably from about 0.5 to about 100 gsm.

As with the basis weight, the composite nonwoven fibrous web will exhibit a thickness, which may be varied depending upon the particular end use of the web. Typically, the single-layer composite nonwoven fibrous web has a thickness of less than about 300 mm, more preferably 100 mm or less. In some embodiments, the single-layer composite nonwoven fibrous web has a thickness of from about 0.1 mm to about 150 mm. In additional embodiments, the single-layer composite nonwoven fibrous web has a thickness of from about 0.2 mm to about 100 mm. In further embodiments, the single-layer composite nonwoven fibrous web has a thickness of from about 0.5 mm to about 75 mm. In other embodiments, the single-layer composite nonwoven fibrous web has a thickness of from about 1.0 mm to about 50 mm.

Various components of exemplary composite nonwoven fibrous webs according to the present disclosure will now be described.

B. Composite Nonwoven Fibrous Web Components

Composite nonwoven fibrous webs of the present disclosure may comprise one or more of the following components.

1. Fiber Component

As noted above, exemplary composite nonwoven fibrous webs according to the present disclosure comprise a population of microfibers or coarse microfibers having a population median diameter of at least 1 µm formed as a first layer, and a population of fine fibers having a population median diameter less than 10 µm formed as a second layer adjoining the first layer. At least one of the fiber populations may be oriented. In certain exemplary embodiments, the microfibers or coarse microfibers and fine fibers are polymeric. In other exemplary embodiments, the microfiber or coarse microfiber population has a population median diameter of at least 3 µm, at least 5 µm, or at least 10 µm; and the fine fiber population has a population median diameter less than 10 µm, less than 5 µm; less than 3 µm; or less than 1 µm.

In further exemplary embodiments, at least one of the fiber populations comprises polymeric fibers that are oriented. Oriented fibers are fibers where there is molecular orientation within the fiber. Fully oriented and partially oriented polymeric fibers are known and commercially available. Orientation of fibers can be measured in a number of ways, including birefringence, heat shrinkage, X-ray scattering, and elastic modulus (see e.g. *Principles of Polymer Processing,* Zehev Tadmor and Costas Gogos, John Wiley and Sons, New York, 1979, pp. 77-84).

It is important to note that molecular orientation is distinct from crystallinity, as both crystalline and amorphous materials can exhibit molecular orientation independent from crystallization. Thus, even though commercially known sub-micrometer fibers made by melt-blowing or electrospinning are not oriented, there are known methods of imparting molecular orientation to fibers made using those processes. However, the process described by Torobin (see e.g., U.S. Pat. No. 4,536,361) has not been shown to produce molecularly oriented fibers.

a. Microfibers

The composite nonwoven fibrous webs of the present disclosure comprise at least one layer of microfiber or coarse fiber components, such as a microfiber component. In some embodiments, a preferred microfiber or coarse fiber component comprises a population of microfibers having a population median fiber diameter of at least 1 µm. In other exemplary embodiments, a preferred coarse fiber component comprises a population of microfibers (more preferably polymeric microfibers) having a population median fiber diameter of at least 10 µm. In certain other exemplary embodiments, the microfiber component comprises a fiber population having a population median fiber diameter ranging from about 2 µm to about 100 µm. In further exemplary embodiments, the microfiber component comprises a fiber population having a median fiber diameter ranging from about 5 µm to about 50 µm.

In the present disclosure, the "median fiber diameter" of fibers in a given microfiber component is determined by producing one or more images of the fiber structure, such as by using a scanning electron microscope; measuring the fiber diameter of clearly visible fibers in the one or more images resulting in a total number of fiber diameters, x; and calculating the median fiber diameter of the x fiber diameters. Typically, x is greater than about 50, and desirably ranges from about 50 to about 200. However, in some cases, x may be selected to be as low as 30 or even 20. These lower values of x may be particularly useful for large diameter fibers, or for highly entangled fibers.

In some exemplary embodiments, the microfiber component may comprise one or more polymeric materials. Generally, any fiber-forming polymeric material may be used in preparing the microfiber, though usually and preferably the fiber-forming material is semi-crystalline. The polymers commonly used in fiber formation, such as polyethylene, polypropylene, polyethylene terephthalate, nylon, and urethanes, are especially useful. Webs have also been prepared from amorphous polymers such as polystyrene. The specific polymers listed here are examples only, and a wide variety of other polymeric or fiber-forming materials are useful.

Suitable polymeric materials include, but are not limited to, polyolefins such as polybutylene, polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

A variety of synthetic fiber-forming polymeric materials may be employed, including thermoplastics and especially extensible thermoplastics such as linear low density polyethylenes (e.g., those available under the trade designation DOWLEX™ from Dow Chemical Company, Midland, Mich.), thermoplastic polyolefinic elastomers (TPE's, e.g., those available under the trade designations ENGAGE™ from Dow Chemical Company, Midland, Mich.; and VISTAMAXX™ from Exxon-Mobil Chemical Company, Houston, Tex.), ethylene alpha-olefin copolymers (e.g., the ethylene butene, ethylene hexene or ethylene octene copolymers available under the trade designations EXACT™ from Exxon-Mobil Chemical Company, Houston, Tex.; and ENGAGE™ from Dow Chemical Company, Midland, Mich.), ethylene vinyl acetate polymers (e.g., those available under the trade designations ELVAX™ from E. I. DuPont de Nemours & Co., Wilmington, Del.), polybutylene elastomers (e.g., those available under the trade designations CRASTIN™ from E. I. DuPont de Nemours & Co., Wilmington, Del.; and POLYBUTENE-1™ from Basell Polyolefins, Wilmington, Del.), elastomeric styrenic block copolymers (e.g., those available under the trade designations KRATON™ from Kraton Polymers, Houston, Tex.; and SOLPRENE™ from Dynasol Elastomers, Houston, Tex.) and polyether block copolyamide elastomeric materials (e.g., those available under the trade designation PEBAX™ from Arkema, Colombes, France). Thermoplastic Polyolefinic Elastomers (TPE's) are especially preferred.

A variety of natural fiber-forming materials may also be made into nonwoven microfibers according to exemplary embodiments of the present disclosure. Preferred natural materials may include bitumen or pitch (e.g., for making carbon fibers). The fiber-forming material can be in molten form or carried in a suitable solvent. Reactive monomers can also be employed, and reacted with one another as they pass to or through the die. The nonwoven webs may contain a mixture of fibers in a single layer (made for example, using two closely spaced die cavities sharing a common die tip), a plurality of layers (made for example, using a plurality of die cavities arranged in a stack), or one or more layers of multi-component fibers (such as those described in U.S. Pat. No. 6,057,256 (Krueger et al.).

Fibers also may be formed from blends of materials, including materials into which certain additives have been blended, such as pigments or dyes. Bi-component microfibers, such as core-sheath or side-by-side bi-component fibers, may be prepared ("bi-component" herein includes fibers with two or more components, each component occupying a part of the cross-sectional area of the fiber and extending over a substantial length of the fiber), as may be bicomponent sub-micrometer fibers. However, exemplary embodiments of the disclosure may be particularly useful and advantageous with monocomponent fibers (in which the fibers have essentially the same composition across their cross-section, but "monocomponent" includes blends or additive-containing materials, in which a continuous phase of substantially uniform composition extends across the cross-section and over the length of the fiber). Among other benefits, the ability to use single-component fibers reduces complexity of manufacturing and places fewer limitations on use of the web.

In addition to the fiber-forming materials mentioned above, various additives may be added to the fiber melt and extruded to incorporate the additive into the fiber. Typically, the amount of additives is less than about 25 weight percent, desirably, up to about 5.0 weight percent, based on a total weight of the fiber. Suitable additives include, but are not limited to, particulates, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoro chemicals.

One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, fluid barrier or adhesive tack related properties.

b. Fine Fibers

The composite nonwoven fibrous webs of the present disclosure comprise at least one layer of fine fiber components. In certain exemplary embodiments, the fine fiber component comprises a population of fine microfibers having a population median diameter less than 10 µm. In other exemplary embodiments, the fine fiber component comprises a population of ultrafine microfibers having a population median diameter less than about 2 µm. In certain presently preferred embodiments, the fine fiber component comprises a population of sub-micrometer fibers having a population median diameter less than 1 µm.

In some exemplary embodiments, the sub-micrometer fiber component comprises a fiber population having a population median fiber diameter ranging from about 0.2 µm to about 0.9 µm. In other exemplary embodiments, the sub-micrometer fiber component comprises a fiber population having a population median fiber diameter ranging from about 0.5 μm to about 0.7 μm.

In the present disclosure, the "median fiber diameter" of fibers in a given sub-micrometer fiber component is determined by producing one or more images of the fiber structure, such as by using a scanning electron microscope; measuring the fiber diameter of clearly visible fibers in the one or more images resulting in a total number of fiber diameters, x; and calculating the median fiber diameter of the x fiber diameters. Typically, x is greater than about 50, and desirably ranges from about 50 to about 200. However, in some cases, x may be selected to be as low as 30 or even 20. These lower values of x may be particularly useful for highly entangled fibers.

In some exemplary embodiments, the sub-micrometer fiber component may comprise one or more polymeric materials. Suitable polymeric materials include, but are not limited to, polyolefins such as polypropylene and polyethylene; polyesters such as polyethylene terephthalate and polybutylene terephthalate; polyamide (Nylon-6 and Nylon-6,6); polyurethanes; polybutene; polylactic acids; polyvinyl alcohol; polyphenylene sulfide; polysulfone; fluid crystalline polymers; polyethylene-co-vinylacetate; polyacrylonitrile; cyclic polyolefins; polyoxymethylene; polyolefinic thermoplastic elastomers; or a combination thereof.

The sub-micrometer fiber component may comprise monocomponent fibers comprising any one of the above-mentioned polymers or copolymers. In this exemplary embodiment, the monocomponent fibers may contain additives as described below, but comprise a single fiber-forming material selected from the above-described polymeric materials. Further, in this exemplary embodiment, the monocomponent fibers typically comprise at least 75 weight percent of any one of the above-described polymeric materials with up to 25 weight percent of one or more additives. Desirably, the monocomponent fibers comprise at least 80 weight percent, more desirably at least 85 weight percent, at least 90 weight percent, at least 95 weight percent, and as much as 100 weight percent of any one of the above-described polymeric materials, wherein all weights are based on a total weight of the fiber.

The sub-micrometer fiber component may also comprise multi-component fibers formed from (1) two or more of the above-described polymeric materials and (2) one or more additives as described below. As used herein, the term "multi-component fiber" is used to refer to a fiber formed from two or more polymeric materials. Suitable multi-component fiber configurations include, but are not limited to, a sheath-core configuration, a side-by-side, a layered or a segmented pie/wedge configuration (for example, U.S. Pat. No. 4,729,371 describes layered bi-component meltblown fibers, also referred to as striped fibers; and PCT Pat. Pub. WO 2008/085545 describes segmented pie/wedge fibers and layered fibers in FIGS. 1a-1e), and an "islands-in-the-sea" configuration (for example, fibers produced by Kuraray Company, Ltd., Okayama, Japan).

For sub-micrometer fiber components formed from multi-component fibers, desirably the multi-component fiber comprises (1) from about 75 to about 99 weight percent of two or more of the above-described polymers and (2) from about 25 to about 1 weight percent of one or more additional fiber-forming materials based on the total weight of the fiber.

2. Optional Particulate Component

As noted above, exemplary composite nonwoven fibrous webs according to the present disclosure optionally include a plurality of particulates in one or both of the first and second layers. Any suitable particulate material may be selected. Suitable particulates may have a variety of physical forms (e.g., solid particles, porous particles, hollow bubbles, agglomerates, discontinuous fibers, staple fibers, flakes, and the like); shapes (e.g., spherical, elliptical, polygonal, needle-like, and the like); shape uniformities (e.g., monodisperse, substantially uniform, non-uniform or irregular, and the like); composition (e.g. inorganic particulates, organic particulates, or combination thereof); and size (e.g., sub-micrometer-sized, micro-sized, and the like).

With particular reference to particulate size, in some exemplary embodiments, it may be desirable to control the size of a population of the particulates. In certain exemplary embodiments, particulates are physically entrained or trapped in the fiber matrix. In such embodiments, the population of particulates is preferably selected to have a median diameter of at least 50 μm, more preferably at least 75 μm, still more preferably at least 100 μm.

In other exemplary embodiments, it is preferred to use finer particulates that are adhesively bonded to the fibers using an adhesive, for example a hot melt adhesive, and/or the application of heat to one or both of thermoplastic particulates or thermoplastic fibers (i.e., thermal bonding). In such embodiments, it is generally preferred that the particulates have a median diameter of at least 25 μm, more preferably at least 30 μm, most preferably at least 40 μm.

However, in some exemplary embodiments in which both an adhesive and thermal bonding are used to adhere the particulates to the fibers, the particulates may comprise a population of sub-micrometer-sized particulates having a population median diameter of less than one micrometer (μm), more preferably less than about 0.9 μm, even more preferably less than about 0.5 μm, most preferably less than about 0.25 μm. Such sub-micrometer-sized particulates may be particularly useful in applications where high surface area and/or high absorbency and/or adsorbent capacity is desired. In further exemplary embodiments, the population of sub-micrometer-sized particulates has a population median diameter of at least 0.001 μm, more preferably at least about 0.01 μm, most preferably at least about 0.1 μm, most preferably at least about 0.2 μm.

In further exemplary embodiments, the particulates comprise a population of micro-sized particulates having a population median diameter of at most about 2,000 μm, more preferably at most about 1,000 μm, most preferably at most about 500 μm. In other exemplary embodiments, the particulates comprise a population of micro-sized particulates having a population median diameter of at most about 10 μm, more preferably at most about 5 μm, even more preferably at most about 2 μm (e.g., ultrafine microfibers).

Multiple types of particulates may also be used within a single finished web. Using multiple types of particulates, it may be possible to generate continuous particulate webs even if one of the particulate types does not bond with other particles of the same type. An example of this type of system would be one where two types are particles are used, one that bonds the particulates together (e.g., a discontinuous polymeric fiber particulate) and another that acts as an active particle for the desired purpose of the web (e.g., a sorbent particulate such as activated carbon). Such exemplary embodiments may be particularly useful for fluid filtration applications.

In certain such exemplary embodiments, it may be advantageous to use at least one particulate that has a surface that can be made adhesive or "sticky" so as to bond together the particulates to form a mesh or support matrix for the fiber component. In this regard, useful particulates may comprise a polymer, for example, a thermoplastic polymer, which may be in the form of discontinuous fibers. Suitable polymers include polyolefins, particularly TPE's (e.g., VISTMAXX™, available from Exxon-Mobil Chemical Company, Houston, Tex.). In further exemplary embodiments, particulates comprising a TPE, particularly as a surface layer or surface coating, may be preferred, as TPE's are generally somewhat tacky, which may assist bonding together of the particulates to form a three-dimensional network before addition of the fibers to form the composite nonwoven fibrous web. In certain exemplary embodiments, particulates comprising a VISTMAXX™ TPE may offer improved resistance to harsh chemical environments, particularly at low pH (e.g., pH no greater than about 3) and high pH (e.g., pH of at least about 9) and in organic solvents.

In additional exemplary embodiments, it may be advantageous to use at least one sorbent particulate, for example, an absorbent, an adsorbent, activated carbon, an anion exchange resin, a cation exchange resin, a molecular sieve, or a combination thereof. A variety of sorbent particles can be employed. Desirably the sorbent particles will be capable of absorbing or adsorbing gases, aerosols or fluids expected to be present under the intended use conditions.

The sorbent particles can be in any usable form including beads, flakes, granules or agglomerates. Preferred sorbent particles include activated carbon; alumina and other metal oxides; sodium bicarbonate; metal particles (e.g., silver particles) that can remove a component from a fluid by adsorption, chemical reaction, or amalgamation; particulate catalytic agents such as hopcalite (which can catalyze the oxidation of carbon monoxide); clay and other minerals treated with acidic solutions such as acetic acid or alkaline solutions such as aqueous sodium hydroxide; ion exchange resins; molecular sieves and other zeolites; silica; biocides; fungicides and virucides. Activated carbon and alumina are particularly preferred sorbent particles. Mixtures of sorbent particles can also be employed, e.g., to absorb mixtures of gases, although in practice to deal with mixtures of gases it may be better to fabricate a multilayer sheet article employing separate sorbent particles in the individual layers.

In certain exemplary embodiments, the fluid filtration medium comprises an absorbent, an adsorbent, activated carbon, an anion exchange resin, a cation exchange resin, a molecular sieve, or a combination thereof. In an exemplary presently preferred embodiment, the sorbent particles comprise an activated carbon, diatomaceous earth, an ion exchange resin, a metal ion exchange sorbent, an activated alumina, an antimicrobial compound, an acid gas adsorbent, an arsenic reduction material, an iodinated resin, or combinations thereof. Certain presently preferred embodiments provide that the web has a sorbent particle density in the range of about 0.20 to about 0.5 g/cc.

The desired sorbent particle size can vary a great deal and usually will be chosen based in part on the intended service conditions. As a general guide, the sorbent particles may vary in size from about 0.001 to about 3000 μm median diameter. Preferably the sorbent particles are from about 0.01 to about 1500 μm median diameter, more preferably from about 0.02 to about 750 μm median diameter, and most preferably from about 0.05 to about 300 μm median diameter. In certain exemplary embodiments, the sorbent particles may comprise nanoparticulates having a population median diameter less than 1 μm. Porous nanoparticulates may have the advantage of providing high surface area for sorption of contaminants from a fluid medium (e.g., absorption and/or adsorption). In such exemplary embodiments using ultrafine or nanoparticulates, it is preferred that the particulates are adhesively bonded to the fibers using an adhesive, for example a hot melt adhesive, and/or the application of heat to one or both of thermoplastic particulates or thermoplastic fibers (i.e., thermal bonding).

Mixtures (e.g., bimodal mixtures) of sorbent particles having different size ranges can also be employed, although in practice it may be better to fabricate a multilayer sheet article employing larger sorbent particles in an upstream layer and smaller sorbent particles in a downstream layer. At least 80 weight percent sorbent particles, more preferably at least 84 weight percent and most preferably at least 90 weight percent sorbent particles are enmeshed in the web. Expressed in terms of the web basis weight, the sorbent particle loading level may for example be at least about 500 gsm for relatively fine (e.g. sub-micrometer-sized) sorbent particles, and at least about 2,000 gsm for relatively coarse (e.g., micro-sized) sorbent particles.

3. Optional Support Layer

The composite nonwoven fibrous webs of the present disclosure may further comprise an optional support layer (not shown in the figures). In certain presently preferred embodiments, the optional support layer is porous. When present, the optional support layer may provide most of the strength of the composite nonwoven fibrous article. In some embodiments, the above-described sub-micrometer fiber component tends to have very low strength, and can be damaged during normal handling. Attachment of the sub-micrometer fiber component to a support layer lends strength to the sub-micrometer fiber component, while retaining high porosity, and hence the desired absorbent properties of the sub-micrometer fiber component. A multi-layer composite nonwoven fibrous web structure may also provide sufficient strength for further processing, which may include, but is not limited to, winding the web into roll form, removing the web from a roll, molding, pleating, folding, stapling, weaving, and the like.

A variety of support layers may be used in the present disclosure. Suitable support layers include, but are not limited to, a nonwoven fabric, a woven fabric, a knitted fabric, a foam layer, a film, a paper layer, an adhesive-backed layer, a foil, a mesh, an elastic fabric (i.e., any of the above-described woven, knitted or nonwoven fabrics having elastic properties), an apertured web, an adhesive-backed layer, or any combination thereof. In one exemplary embodiment, the porous support layer comprises a polymeric nonwoven fabric. Suitable nonwoven polymeric fabrics include, but are not limited to, a spunbonded fabric, a meltblown fabric, a carded web of staple length fibers (i.e., fibers having a fiber length of less than about 100 mm), a needle-punched fabric, a split film web, a hydroentangled web, an airlaid staple fiber web, or a combination thereof. In certain exemplary embodiments, the support layer comprises a web of bonded staple fibers. As described further below, bonding may be effected using, for example, thermal bonding, adhesive bonding, powdered binder bonding, hydroentangling, needlepunching, calendering, or a combination thereof.

The support layer may have a basis weight and thickness depending upon the particular end use of the composite nonwoven fibrous article. In some embodiments of the present disclosure, it is desirable for the overall basis weight and/or thickness of the composite nonwoven fibrous article to be kept at a minimum level. In other embodiments, an overall minimum basis weight and/or thickness may be required for a given application. Typically, the support layer has a basis weight of less than about 150 gsm. In some embodiments, the support layer has a basis weight of from about 5.0 gsm to about 100 gsm. In other embodiments, the support layer has a basis weight of from about 10 gsm to about 75 gsm.

As with the basis weight, the support layer may have a thickness, which varies depending upon the particular end use of the composite nonwoven fibrous article. Typically, the support layer has a thickness of less than about 150 millimeters (mm), more preferably less than 100 mm, most preferably less than 50 mm. In certain embodiments, the support layer has a thickness of at least about 0.1 mm, more preferably at least 0.5 mm, most preferably at least 1.0 mm. In some embodiments, the support layer has a thickness of from about 1.0 mm to about 35 mm. In other embodiments, the support layer has a thickness of from about 2.0 mm to about 25 mm.

In certain exemplary embodiments, the support layer may comprise a microfiber component, for example, a population of microfibers. In such embodiments, it may be preferred to deposit the above-described sub-micrometer fiber population directly onto the microfiber support layer to form a multi-layer composite nonwoven fibrous web. Optionally, the above-described microfiber population may be deposited with or over the sub-micrometer fiber population on the microfiber support layer. In certain exemplary embodiments, the population of microfibers comprising the support layer is compositionally the same as the population of microfibers forming the overlayer.

The sub-micrometer fiber component may be permanently or temporarily bonded to a given support layer. In some embodiments of the present disclosure, the sub-micrometer fiber component is permanently bonded to the support layer (i.e., the sub-micrometer fiber component is attached to the porous support layer with the intention of being permanently bonded thereto).

In some embodiments of the present disclosure, the above-described sub-micrometer fiber component may be temporarily bonded to (i.e., removable from) a support layer, such as a release liner. In such embodiments, the sub-micrometer fiber component may be supported for a desired length of time on a temporary support layer, and optionally further processed on a temporary support layer, and subsequently permanently bonded to a second support layer.

In one exemplary embodiment of the present disclosure, the support layer comprises a spunbonded fabric comprising polypropylene fibers. In a further exemplary embodiment of the present disclosure, the support layer comprises a carded web of staple length fibers, wherein the staple length fibers comprise: (i) low-melting point or binder fibers; and (ii) high-melting point or structural fibers. Typically, the binder fibers have a melting point of at least 10° C. less than a melting point of the structural fibers, although the difference between the melting point of the binder fibers and structural fibers may be greater than 10° C. Suitable binder fibers include, but are not limited to, any of the above-mentioned polymeric fibers. Suitable structural fibers include, but are not limited to, any of the above-mentioned polymeric fibers, as well as inorganic fibers such as ceramic fibers, glass fibers, and metal fibers; and organic fibers such as cellulosic fibers.

In certain presently preferred embodiments, the support layer comprises a carded web of staple length fibers, wherein the staple length fibers comprise a blend of PET monocomponent, and PET/coPET bicomponent staple fibers. In one exemplary presently preferred embodiment, the support layer comprises a carded web of staple length fibers, wherein the staple length fibers comprise: (i) about 20 weight percent bicomponent binder fibers (e.g. INVISTA™ T254 fibers, available from Invista, Inc., Wichita, Kansas), 12 d×1.5"; and (ii) about 80 weight percent structural fibers (e.g. INVISTA™ T293 PET fibers), 32 d×3".

As described above, the support layer may comprise one or more layers in combination with one another. In one exemplary embodiment, the support layer comprises a first layer, such as a nonwoven fabric or a film, and an adhesive layer on the first layer opposite the sub-micrometer fiber component. In this embodiment, the adhesive layer may cover a portion of or the entire outer surface of the first layer. The adhesive may comprise any known adhesive including pressure-sensitive adhesives, heat activatable adhesives, etc. When the adhesive layer comprises a pressure-sensitive adhesive, the composite nonwoven fibrous article may further comprise a release liner to provide temporary protection of the pressure-sensitive adhesive.

4. Optional Additional Layers

The composite nonwoven fibrous webs of the present disclosure may comprise additional layers in combination with the sub-micrometer fiber layer, the microfiber layer, the optional support layer, or all of the above (not shown in the Figures).

Suitable additional layers include, but are not limited to, a color-containing layer (e.g., a print layer); any of the above-described support layers; one or more additional sub-micrometer fiber components having a distinct average fiber diameter and/or physical composition; one or more secondary fine sub-micrometer fiber layers for additional insulation performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof.

5. Optional Adhesive

In certain exemplary embodiments, the composite nonwoven fibrous webs of the present disclosure may further comprise one or more adhesives to enable the composite nonwoven fibrous article to be attached to a substrate. As discussed above, an adhesive may be used to attach the layers of the composite nonwoven fibrous article. Presently preferred adhesives include hot melt adhesives and curable adhesives, for example, thermally and radiation curable adhesives such as epoxy, urethane, and acrylate adhesives. In addition to adhesives, other attachment devices may be used, for example, hook and loop fasteners, tape, clamps, and the like.

C. Methods of Making Composite Nonwoven Fibrous Webs

The present disclosure is also directed to methods of making the composite nonwoven fibrous webs. In a further aspect, the disclosure provides a method of making a composite nonwoven fibrous web comprising forming a first layer comprising a population of coarse polymeric microfibers having a population median fiber diameter of at least 10 μm, forming a second layer comprising a population of fine polymeric microfibers having a population median fiber diameter of less than 10 μm, orienting one or both of the first and second layer, and bonding the first layer to the second layer. In certain exemplary embodiments, one or both of the first and second layers comprises a plurality of particulates.

In another aspect, the disclosure provides a method of making a composite nonwoven fibrous web comprising forming a first layer comprising a population of microfibers having a median fiber diameter of at least 1.0 μm, and forming a second layer impinging on the first layer, the second layer including a population of sub-micrometer fibers having a median fiber diameter of less than 1 μm, wherein at least one of the fiber populations may be oriented. In certain exemplary embodiments, at least the first layer comprises a plurality of particulates, which may be sorbent particulates.

1. Formation of Fibers

Suitable fiber streams from which to make a composite nonwoven fibrous web according to exemplary embodiments of the present disclosure include known methods of generating nonwoven fibers, as well as other methods that provide an opportunity to combine the particulates with a fiber stream formed during the web forming process. In certain exemplary embodiments, the fiber streams may comprise sub-micrometer fibers, ultrafine microfibers, fine microfibers, microfibers, or a blend of one or more thereof.

A number of processes may be used to produce a sub-micrometer fiber stream, including, but not limited to melt blowing, melt spinning, electrospinning, gas jet fibrillation, or combination thereof. Particularly suitable processes include, but are not limited to, processes disclosed in U.S. Pat. No. 3,874,886 (Levecque et al.), U.S. Pat. No. 4,363,646 (Torobin), U.S. Pat. No. 4,536,361 (Torobin), U.S. Pat. No. 5,227,107 (Dickenson et al.), U.S. Pat. No. 6,183,670 (Torobin), U.S. Pat. No. 6,269,513 (Torobin), U.S. Pat. No. 6,315,806 (Torobin), U.S. Pat. No. 6,743,273 (Chung et al.), U.S. Pat. No. 6,800,226 (Gerking); German Patent DE 19929709 C2 (Gerking); and Pub. PCT App. No. WO 2007/001990 A2 (Krause et al.).

Suitable processes for forming sub-micrometer fibers also include electrospinning processes, for example, those processes described in U.S. Pat. No. 1,975,504 (Formhals). Other suitable processes for forming sub-micrometer fibers are described in U.S. Pat. No. 6,114,017 (Fabbricante et al.), U.S. Pat. No. 6,382,526 B1 (Reneker et al.); and U.S. Pat. No. 6,861,025 B2 (Erickson et al.).

A number of processes may also be used to produce a microfiber stream, including, but not limited to, melt blowing, melt spinning, filament extrusion, plexifilament formation, spunbonding, wet spinning, dry spinning, or a combination thereof. Suitable processes for forming microfibers are described in U.S. Pat. Nos. 6,315,806 (Torobin), U.S. Pat. No. 6,114,017 (Fabbricante et al.), U.S. Pat. No. 6,382,526 B1 (Reneker et al.), and U.S. Pat. No. 6,861,025 B2 (Erickson et al.). Alternatively, a population of microfibers may be formed or converted to staple fibers and combined with a population of sub-micrometer fibers using, for example, using a process as described in U.S. Pat. No. 4,118,531 (Hauser).

In some exemplary embodiments, the method of making a composite nonwoven fibrous web comprises combining the microfiber or coarse microfiber population with the fine microfiber population, the ultrafine microfiber population, or the sub-micrometer fiber population by mixing fiber streams, hydroentangling, wet forming, plexifilament formation, or a combination thereof. In combining the microfiber or coarse microfiber population with the fine, ultrafine or sub-micrometer fiber populations, multiple streams of one or both types of fibers may be used, and the streams may be combined in any order. In this manner, nonwoven composite fibrous webs may be formed exhibiting various desired concentration gradients and/or layered structures.

For example, in certain exemplary embodiments, the population of fine, ultrafine or sub-micrometer fibers may be combined with the population of microfibers or coarse microfibers to form an inhomogenous mixture of fibers. In certain exemplary embodiments, at least a portion of the population of fine, ultrafine or sub-micrometer fibers is intermixed with at least a portion of the population of microfibers. In other exemplary embodiments, the population of fine, ultrafine or sub-micrometer fibers may be formed as an overlayer on an underlayer comprising the population of microfibers. In certain other exemplary embodiments, the population of microfibers may be formed as an overlayer on an underlayer comprising the population of fine, ultrafine or sub-micrometer fibers.

In other exemplary embodiments, the composite nonwoven fibrous web may be formed by depositing the population of fine, ultrafine or sub-micrometer fibers onto a porous support layer, the support layer optionally comprising microfibers, so as to form a population of fine, ultrafine or sub-micrometer fibers on the porous support layer.

The method may comprise a step wherein the support layer, which optionally may comprise polymeric microfibers, is passed through a fiber stream of fine, ultrafine or sub-micrometer fibers. While passing through the fiber stream, fine, ultrafine or sub-micrometer fibers may be deposited onto the support layer so as to be temporarily or permanently bonded to the support layer. When the fibers are deposited onto the support layer, the fibers may optionally bond to one another, and may further harden while on the support layer.

In certain presently preferred embodiments, the fine, ultrafine or sub-micrometer fiber population is combined with an optional porous support layer that comprises at least a portion of the coarse microfiber population. In some exemplary embodiments, the microfibers forming the porous support layer are compositionally the same as the population of microfibers that forms the first layer. In other presently preferred embodiments, the fine, ultrafine or sub-micrometer fiber population is combined with an optional porous support layer and subsequently combined with at least a portion of the coarse microfiber population. In certain other presently preferred embodiments, the porous support layer adjoins the second layer opposite the first layer.

In other exemplary embodiments, the porous support layer comprises a nonwoven fabric, a woven fabric, a knitted fabric, a foam layer, a screen, a porous film, a perforated film, an array of filaments, or a combination thereof. In some exemplary embodiments, the porous support layer comprises a thermoplastic mesh.

2. Optional Particulate Loading

In many applications, substantially uniform distribution of particles throughout the web is desired. There may also be instances where non-uniform distributions may be advantageous. In certain exemplary embodiments, a particulate density gradient may advantageously be created within the composite nonwoven fibrous web. For example, gradients through the depth of the web may create changes to the pore size distribution that could be used for depth filtration. Webs with a surface loading of particles could be formed into a filter where the fluid is exposed to the particles early in the flow path and the balance of the web provides a support structure and means to prevent sloughing of the particles. The flow path could also be reversed so the web can act as a pre-filter to remove some contaminants prior to the fluid reaching the active surface of the particles.

Various methods are known for adding a stream particulates to a nonwoven fiber stream. Suitable methods are described in U.S. Pat. Nos. 4,118,531 (Hauser), U.S. Pat. No. 6,872,311 (Koslow), and U.S. Pat. No. 6,494,974 (Riddell); and in U.S. Patent Application Publication Nos. 2005/0266760 (Chhabra and Isele), 2005/0287891 (Park) and 2006/0096911 (Brey et al.).

In other exemplary embodiments, the optional particulates could be added to a nonwoven fiber stream by air laying a fiber web, adding particulates to the fiber web (e.g., by passing the web through a fluidized bed of particulates), optionally with post heating of the particulate-loaded web to bond the particulates to the fibers. Alternatively, a pre-formed web could be sprayed with a pre-formed dispersion of particulates in a volatile fluid (e.g. an organic solvent, or even water), optionally with post heating of the particulate-loaded web to remove the volatile fluid and bond the particulates to the fibers.

3. Optional Bonding Step

Depending on the condition of the fibers and the relative proportion of microfibers and sub-micrometer fibers, some bonding may occur between the fibers and the particulates, and between the fibers themselves, during collection. However, further bonding between the fibers and the particulates or the fibers themselves in the collected web may be desirable to provide a matrix of desired coherency, making the web more handleable and better able to hold any sub-micrometer fibers within the matrix ("bonding" fibers themselves means adhering the fibers together firmly, so they generally do not separate when the web is subjected to normal handling).

In certain exemplary embodiments, a blend of microfibers and sub-micrometer fibers may be bonded together. Bonding may be achieved, for example, using thermal bonding, adhesive bonding, powdered binder, hydroentangling, needlepunching, calendering, or a combination thereof. Conventional bonding techniques using heat and pressure applied in a point-bonding process or by smooth calender rolls can be used, though such processes may cause undesired deformation of fibers or excessive compaction of the web. A more preferred technique for bonding fibers, particularly microfibers, is the autogenous bonding method disclosed in U.S. Patent Application Publication No. U.S. 2008/0038976 A1.

4. Optional Additional Processing Steps

In addition to the foregoing methods of making and optionally bonding a composite nonwoven fibrous web, one or more of the following process steps may optionally be carried out on the web once formed:

(1) advancing the composite nonwoven fibrous web along a process pathway toward further processing operations;

(2) bringing one or more additional layers into contact with an outer surface of the sub-micrometer fiber component, the microfiber component, and/or the optional support layer;

(3) calendering the composite nonwoven fibrous web;

(4) coating the composite nonwoven fibrous web with a surface treatment or other composition (e.g., a fire retardant composition, an adhesive composition, or a print layer);

(5) attaching the composite nonwoven fibrous web to a cardboard or plastic tube;

(6) winding-up the composite nonwoven fibrous web in the form of a roll;

(7) slitting the composite nonwoven fibrous web to form two or more slit rolls and/or a plurality of slit sheets;

(8) placing the composite nonwoven fibrous web in a mold and molding the composite nonwoven fibrous web into a new shape; and (9) applying a release liner over an exposed optional pressure-sensitive adhesive layer, when present.

One potential disadvantage of post-forming calendaring of the composite nonwoven fibrous web while heating the web may be that the thickness of the web may drop to 40-60% of the original value, leading to higher pressure drop in fluid filtration applications employing the web.

5. Formation of Fluid Filtration Media and Articles

In a further aspect, the disclosure provides a method of making a fluid filtration medium comprising a composite nonwoven fibrous web. The method comprises forming a first layer comprising a population of polymeric microfibers or coarse microfibers having a population median fiber diameter of at least 1.0 µm (more preferably at least 3 µm, 5 µm or 10 µm), forming a second layer comprising a population of fine polymeric microfibers having a population median fiber diameter of less than 10 µm (more preferably less than 3 µm, 2 µm, or 1 µm) and bonding the first layer to the second layer. In certain exemplary embodiments, one or both of the first and second layers may be oriented; in other exemplary embodiments, one or both of the first and second layers may comprise a plurality of particulates.

In yet another aspect, the disclosure provides a method of making a fluid filtration medium comprising a composite nonwoven fibrous web. The method comprises forming a first layer comprising a population of microfibers having a median fiber diameter of at least 1 µm, and forming a second layer impinging on the first layer, the second layer including a population of sub-micrometer fibers having a median fiber diameter of less than 1 µm, wherein at least one of the fiber populations may be oriented. In certain exemplary embodiments, at least the first layer comprises a plurality of particulates, which may be sorbent particulates.

In one exemplary embodiment, the method further comprises forming a first plurality of layers comprises polymeric fibers having a first Effective Fiber Diameter (EFD) and a second plurality of layers comprises polymeric fibers having a second EFD. Another embodiment provides that the method further comprises providing the particulates in a first plurality of layers at a first density and in a second plurality of layers at a second density. In another embodiment, the method further comprises providing a first plurality of layers having a first sorbent and a second plurality of layers having a second sorbent.

Exemplary composite nonwoven fibrous webs according to the present disclosure may include gradient densities achieved by adjustments to the meltblown filaments, the loaded particulates or both. In one or more embodiments, the meltblown filaments airstream are modified to create various effects. Blends of filament population median size distributions can be formed by mixing the resulting fiber airstreams from two or more separate dies that are operating at different target Effective Fiber Diameters.

A similar effect can be obtained by use of the mixed blown or alternating fiber die tips as described in U.S. Patent Application Publication No. 2008/0026659 A1. The mixed blown approach could also be used to create zones across the die face having different size fibers or gradients of fiber sizes. In so doing, structure of filter layers can be tailored for use in, for example, a depth filter. Particles, particulates, agglomerates, other regular, irregular or hollow shapes or mixtures thereof can be added into one or more of these filament streams and collected on a rotating mandrel or an advancing collecting mandrel to form a fluid filtration article.

In other exemplary embodiments, two or more fiber-forming dies may operate to form separate layers instead of forming a mixed filament airstreams. The dies could also be operating side-by-side to create a distinct layered effect as the element traverses on the rotating mandrel. Additional changes to performance could be possible by using different polymers or multi-component fibers in one or more of the dies.

A gradient or even layered fluid filtration article may also be formed using an advancing collector mandrel by having the particle loader adding particulate to only targeted zones of the web. This can be accomplished by using a narrow particle loader in conjunction with a wider die or by using a patterned feed roll in the particle loader. The feed roll uses machined cavities to control the volumetric feed rate as the roll turns against the doctor blade. By changing the volume of the cavities across (or around) the face of the feed roller, the local-feeding of the particulates can be controlled and hence the local-added weight of particulates in the resultant web.

Another approach is to use a segmented hopper in the particle loader. The particulates are only added to the segmented regions where you want feeding to occur. This approach would also allow the use of different particles in the segmented regions to enable use of two particle sizes or have controlled addition of a treated sorbent or one having special performance. Multiple particle loaders can be used to vary the amount or type of particle loaded into the targeted region.

In a further embodiment, the web collector can comprise a cartridge winding mechanism operative to either make individual filters formed on a winding mandrel or on a rotating cantilevered shaft equipped with some sort of filter cartridge extraction device designed to substantially continuously pull/push the forming filter cartridge from the rotating shaft.

By using these approaches, a composite nonwoven fibrous web may be formed that is tailored for a specific application. For example, an inner layer of fine polypropylene fibers can be formed directly adjacent to the mandrel core that will help reduce sloughing and shedding. Next to the inner layer, a middle layer of particle-loaded web for the primary separation can be provided. In addition, on the middle layer, an outer layer of desired functionality can be formed, for example, the outer layer can have greater pore size to remove larger contaminants before reaching the primary separation layer and/or have larger diameter fibers to act as an additional pre-filter layer. Many other possible arrangements could also be produced by one skilled in the art and are expected to fall within the scope of the present disclosure.

D. Methods of Using Fluid Filtration Media in a Fluid Filtration Article

In another aspect, the disclosure provides methods of using a fluid filtration medium or element to make a fluid filtration article. In exemplary embodiments, the fluid filtration element is a composite nonwoven fibrous web (or web stack) comprising a population of microfibers having a median diameter of at least 1 µm formed as a first layer, and a population of sub-micrometer fibers having a median diameter less than one micrometer (µm) formed as a second layer adjoining the first layer, optionally wherein at least one of the fiber populations is oriented. Optionally, at least one of the first layer and the second layer further comprises a plurality of particulates.

Another exemplary embodiment provides that the fluid filtration article element a sorbent density gradient in an axial configuration. An alternative exemplary embodiment provides that the fluid filtration element has a sorbent density gradient in a radial configuration. In one particular embodiment, the fluid filtration element further comprises a plurality of layers of a second web of self-supporting nonwoven polymer fibers that are substantially free of sorbent particles.

In another aspect, the disclosure provides a fluid filtration element comprising two or more porous layers wound to form a porous fluid filtration article, wherein the porous layers comprise a web of self-supporting nonwoven polymeric fibers and a plurality of particulates enmeshed in the web. The fluid filtration article may also include a fluid-impermeable housing surrounding the porous article, an inlet in fluid communication with a first (coarse fiber) layer, which may be an overlayer or an underlayer; and an outlet in fluid communication with a second (fine fiber) layer, which may correspondingly be an underlayer or an overlayer. In certain exemplary embodiments, the housing may include at least one fluid inlet in fluid communication with a first layer comprising a population of microfibers having a population median diameter of at least 1 µm, and at least one fluid outlet in fluid communication with a second layer comprising a population of sub-micrometer fibers having a population median diameter less than 1 µm, adjoining the first layer. In one exemplary embodiment, the first and second layers may be fused together. In another exemplary embodiment, the porous layers are separate composite layers.

In certain presently preferred embodiments, the fluid filtration medium comprises a first layer comprising a population of microfibers having a population median diameter of at least 1 µm, and a second layer overlaying the first layer comprising a population of sub-micrometer fibers having a population median diameter less than 1 µm. In some exemplary embodiments, the first layer adjoins the porous support. Such a fluid filtration medium may be particularly useful for depth filtration applications in which the first layer comprising the population of microfibers is contacted by a permeating fluid before the second layer comprising the population of sub-micrometer fibers.

In other presently preferred embodiments, the second layer adjoins the porous support. Such a fluid filtration medium may be particularly useful for absolute filtration applications in which the first layer comprising the population of microfibers is contacted by a permeating fluid after the second layer comprising the population of sub-micrometer fibers.

The fluid filtration article may take a variety of shapes and forms. In certain exemplary embodiments, the fluid filtration article takes the form of a three-dimensional geometric shape, which in certain exemplary embodiments, may be selected from a cylinder, a circular disc, an elliptical disk, or a polygonal disk. Other suitable shapes and forms are known to those skilled in the art.

A further aspect provides a method of filtering a fluid, the method comprising contacting a fluid filtration article with a permeating fluid. In certain exemplary embodiments, the fluid filtration article comprises a composite nonwoven fibrous web (or web stack) comprising a plurality of porous layers wound to form a porous article, wherein the porous layers comprise a web of self-supporting nonwoven polymeric fiber layers as previously described, and optionally, a plurality of sorbent particles enmeshed in the web; a fluid-impermeable housing surrounding the porous article; an inlet in fluid communication with the first surface; and an outlet in fluid communication with the second surface.

In certain presently preferred embodiments, the composite nonwoven fibrous web (or web stack) comprises a first layer comprising a population of microfibers having a population median diameter of at least 1 µm, and a second layer overlaying the first layer comprising a population of sub-micrometer fibers having a population median diameter less than 1 µm. In some exemplary embodiments, the first layer adjoins the porous support.

The exemplary presently disclosed fluid filtration articles may be used in a variety of ways. In one exemplary embodiment, a permeating fluid passes through the first layer before passing through the second layer. In another exemplary embodiment, a permeating fluid passes through the second layer before passing through the first layer. In a further exemplary embodiment, the second layer is pleated, and the permeating fluid passes through the second layer before passing through the first layer.

In some embodiments, a permeating liquid may be passed through the fluid filtration article under the force of gravity. In other exemplary embodiments, a permeating fluid, which may be a liquid or a gas, may be passed through the fluid filtration article under conditions of pressurized fluid flow, for example, using a liquid pump, gas blower or gas compressor. In some exemplary embodiments, fluid filtration articles according to exemplary presently disclosed embodiments may exhibit reduced pressure drop under conditions of pressurized fluid flow.

EXAMPLES

Exemplary embodiments of the present invention have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims. Furthermore, notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Fabrication of Composite Nonwoven Fibrous Webs

In the following Examples, microfibers or coarse microfibers and fine fibers (which may comprise fine microfibers, ultrafine microfibers, and/or sub-micrometer fibers), are used to form composite nonwoven fibrous webs that are stacked to form multi-layer fluid filtration media. At least one of the fiber populations may be oriented. In certain Examples, the layer comprising microfibers or coarse microfibers includes a plurality of particulates.

Microfiber or Coarse Microfiber Webs (Layers)—Preparatory Examples

The following Preparatory Examples of microfiber or coarse microfiber webs used to form a first microfiber layer were prepared using a meltblowing apparatus equipped with a particle loading apparatus previously described in U.S. Patent Application Publication No. US 2006/0096911 (Brey). Additional details of the apparatus are provided in U.S. Provisional Patent Application No. 61/017,230.

In the Preparatory Examples, FINA 3960 (a 350 melt flow index polypropylene available from Total Petrochemicals, Houston, Tex.), VISTAMAXX™ 2125 (an 80 melt flow index metallocene polypropylene available from Exxon-Mobil Chemical Company, Houston, Tex.), EXXON 3746 polypropylene (available from Exxon-Mobil Chemical Company, Houston, Tex.), and TOTAL 3860 and 3960 polypropylenes (available from Total Petrochemicals, Houston, Tex.) were selected as the base resins. Exemplary microfiber webs were prepared with optional particulates loaded into the webs. Several particle size grades (e.g., mesh sizes) of NC506 (PICA, coconut shell) activated carbon particulates were used in some of the Examples.

Short yardage rolls of approximately 10 inch (about 25.4 cm) wide loaded web were collected at the conditions shown below: The melt temperature is recorded below for the various Examples. The polymer was extruded through a 10 inch (about 25.4 cm) wide drilled orifice die (DOD) at 8 lb/hr (about 3.6 kg/hr) for the FINA 3960 based webs and 6.5 lb/hr (about 3.0 kg/hr) for the VISTAMAXX™ based webs. The die to collector distance (DCD) was about 12 inches (about 30.48 cm). Samples of the base web (no loaded particulates) were collected at the targeted basis weight and evaluated for Effective Fiber Diameter (EFD) according to the method set forth in Davies, C. N., *The Separation of Airborne Dust and Particles,* Institution of Mechanical Engineers, London Proceedings 1B, 1952. Median fiber diameters were determined using Scanning Electron Microscopy (SEM) for Preparatory Example 11, which used a blend of two different polypropylene homopolymers, and which exhibited a bi-modal fiber size distribution. The air temperature and velocity were adjusted to achieve the targeted effective fiber diameter. The results are summarized in Table 1.

TABLE 1

| Particulate-Loaded Microfiber Web | Polymer | EFD (μm) | Basis Weight Base/Loaded (gsm) | Particulates (Mesh Size) | Melt Temperature (° C.) |
|---|---|---|---|---|---|
| Preparatory Example 1 | VISTAMAXX 2125 | 19.8 | 50/390 | NC506 (20 × 50) | 260 |
| Preparatory Example 2 | VISTAMAXX 2125 | 18.8 | 50/564 | NC506 (20 × 50) | 261 |
| Preparatory Example 3 | VISTAMAXX 2125 | 18.8 | 50/527 | NC506 (60 × 100) | 261 |
| Preparatory Example 4 | FINA 3960 | 17.9 | 51/558 | NC506 (60 × 140) | 238 |
| Preparatory Example 5 | FINA 3960 | 8.7 | 52/525 | NC506 (60 × 140) | 310 |
| Preparatory Example 6 | FINA 3960 | 8.7 | 52/568 | NC506 (80 × 325) | 310 |
| Preparatory Example 7 | VISTAMAXX 2125 | 15.4 | 54/562 | NC506 (60 × 140) | 267 |
| Preparatory Example 8 | VISTAMAXX 2125 | 15.4 | 54/521 | NC506 (80 × 325) | 267 |
| Preparatory Example 9 | VISTAMAXX 2125 | 16.4 | 57/511 | NC506 (80 × 325) | 247 |
| Preparatory Example 10 | EXXON 3746 | 3.7 | 51 | None | 244 |
| Preparatory Example 11 | Comingled TOTAL 3860 TOTAL 3960 | SEM: 15 0.7 | 100 | None | 325 325 |

Fine Fiber Webs (Layers)—Examples

In Examples 1-17, the odd numbers of which are Comparative Examples, a meltblown web (PP3546G sediment wrap, available from DELSTAR Technologies, Inc., Middleton, Del.) measured at 0.0175 inches (0.44 mm or 440 μm) thickness, 50.48 gsm basis weight, and a pressure drop of 3.62 mm of water), was used as a second layer comprising fine microfibers. The pressure drop was measured at room temperature (approximately 22° C.) at one atmosphere ambient pressure with a uniform face velocity of 5.3 cm/sec for the air flow. An Effective Fiber Diameter (EFD) of 6.1 micrometers was calculated as the fiber population median diameter for this layer according to the method set forth in Davies, above. Nine inch (22.9 cm) long samples of the DELSTAR meltblown web were used in preparing each of the following Examples.

In Examples 18-26, additional webs comprising fine microfibers (Examples 18-20) and sub-micrometer fibers (Examples 21-26) were used to form one or more additional layers underlaying the first layer as described above. In Examples 18-20, a web designated Preparatory Example 10; formed by meltblowing Exxon 3746 polypropylene (available from Exxon-Mobil Chemical Company, Houston, Tex.) at 10 lb/hr (4.54 kg/hr), 50 gsm basis weight, 7 inch (17.78 cm) "Distance to Collector" (DCD), and comprising fine microfibers having a population median fiber diameter of 3.7 μm (EFD); was used as a second layer to form a single approximately 34 mil (850 μm) thick underlayer having a 6 inch (15.2 cm) total wrap length (Example 18), 2 layers having an 11 inch (27.9 cm) total wrap length (Example 19), and 3 layers having a 17 inch (43.2 cm) total wrap length (Example 20).

In Examples 21-23, a web containing polypropylene submicrometer blown microfiber (BMF) fibers (TOTAL 3960 polypropylene available from Total Petrochemical, Houston, Tex.) intermixed with polypropylene spunbond fibers (TOTAL 3860 polypropylene, also available from Total Petrochemicals, Houston, Tex.), designated Preparatory Example 11, was formed by meltblowing the blown microfibers into the oriented spunbond fibers prior to the mixed fibers being collected into a web, and used to form a single approximately 45.2 mil (1150 μm) thick underlayer having a 6 inch (15.24 cm) total wrap length (Example 21), 2 layers having an 11 inch (26.4 cm) total wrap length (Example 22), and 3 layers having a 17 inch (43.2 cm) total wrap length (Example 23).

In Example 24, Kuraray WJ 05118-01P (100 gsm islands-in-the-sea—polypropylene fibers in ethylene-vinyl alcohol [EVOH] sea), having a population median diameter of 0.6-0.8 μm, was used to form a single underlayer having a 6 inch (15.24 cm) total wrap length.

In Example 25, Kuraray NP060120-14H (100 gsm islands-in-the-sea—polypropylene fibers in EVOH sea) having a population median diameter of 0.6-0.8 μm, was used to form a single approximately 17 mil (430 μm) thick underlayer having a 6 inch (15.24 cm) total wrap length.

In Example 26, a polypropylene spunbond (35 gsm basis weight) support web was coated with polypropylene submicrometer fibers (27 gsm basis weight) having a population median diameter of 0.5-0.6 μm, [obtained as a layered web from Nanofiber Technology Inc (NTI), Charlotte, N.C.] and used to form an underlayer having a 6 inch (15.24 cm) total wrap length.

Fabrication of Fluid Filtration Media

The carbon loaded microfiber or coarse microfiber webs and fine microfiber webs as described above were generally assembled into fluid filtration articles using the following exemplary method:

1. A small section of approximate size of 8 inches wide×12 inches long (about 20.32 cm×30.48 cm) was cut. The sample was weighed and a calculation was made to find the length of web required to obtain a filter that contained approximately 100 grams of media.
2. A rigid tube obtained from InterNet (RN-2540) was obtained with approximate dimensions of 1.45" "Outside Diameter" (OD) and 13.875" length (about 3.68 cm OD×35.24 cm). The tube contained openings of approximately 0.15" (about 0.381 cm) square throughout the tube.
3. The fine fiber web layer was wrapped around the InterNet tube before wrapping the coarse fiber loaded web (on the samples designated with wrap).
4. The correct length of particle loaded coarse fiber web was cut from the sample roll. An approximately 3-4 foot long (about 91.44-121.92 cm) sample was cut to about 8 inches (about 20.32 cm) produce approximately a 100 gram particulate loading.
5. The microfiber or coarse fiber web wrap (Comparative Examples) or composite multi-layer web wrap (Examples) was glued to the outer diameter of the tube using 3M 3164 hot melt glue (available from 3M Company, St. Paul, Minn.).
6. The web was wrapped around the tube for the appropriate length.
7. The outside edge of the web was glued to the inner layer of the web using the same hot melt glue.
8. The tube was taken to a saw and was cut on one end at the point where good loading was visible. The other end was cut to yield a filter that was approximately 8 inches (about 20.32 cm) in length.
9. The ends of the filter were potted in end caps using 3M 3164 hot melt glue.

The exemplary multi-layer composite nonwoven fibrous fluid filtration media are summarized in Table 2.

TABLE 2

| Example Number | Coarse Fiber Layer (Particulate-Loaded) | Fine Fiber Layer | Total Wrap Length (cm) |
|---|---|---|---|
| 1 (Comparative) | Preparatory Example 1 | None | 0 |
| 2 | Preparatory Example 1 | DELSTAR PP3546G | 22.9 |
| 3 (Comparative) | Preparatory Example 2 | None | 0 |
| 4 | Preparatory Example 2 | DELSTAR PP3546G | 22.9 |
| 5 (Comparative) | Preparatory Example 3 | None | 0 |
| 6 | Preparatory Example 3 | DELSTAR PP3546G | 22.9 |
| 7 (Comparative) | Preparatory Example 4 | None | 0 |
| 8 | Preparatory Example 4 | DELSTAR PP3546G | 22.9 |
| 9 (Comparative) | Preparatory Example 5 | None | 0 |
| 10 | Preparatory Example 5 | DELSTAR PP3546G | 22.9 |
| 11 (Comparative) | Preparatory Example 6 | None | 0 |
| 12 | Preparatory Example 6 | DELSTAR PP3546G | 22.9 |
| 13 (Comparative) | Preparatory Example 7 | None | 0 |
| 14 | Preparatory Example 7 | DELSTAR PP3546G | 22.9 |
| 15 (Comparative) | Preparatory Example 8 | None | 0 |
| 16 | Preparatory Example 8 | DELSTAR PP3546G | 22.9 |
| 17 (Comparative) | Preparatory Example 9 | None | 0 |
| 18 | Preparatory Example 9 | Preparatory Example 10 | 15.2 |
| 19 | Preparatory Example 9 | Preparatory Example 10 | 27.9 |
| 20 | Preparatory Example 9 | Preparatory Example 10 | 43.2 |
| 21 | Preparatory Example 9 | Preparatory Example 11 | 15.2 |
| 22 | Preparatory Example 9 | Preparatory Example 11 | 26.4 |
| 23 | Preparatory Example 9 | Preparatory Example 11 | 43.2 |
| 24 | Preparatory Example 9 | Kuraray WJ 05118-01P | 15.2 |
| 25 | Preparatory Example 9 | Kuraray NP060120-14H | 15.2 |
| 26 | Preparatory Example 9 | NTI Nanofiber Web | 15.2 |

Testing of Fluid Filtration Media

Certain fluid filtration articles formed according to the above Examples 1-26 were evaluated according to performance tests, including initial flush turbidity and pressure drop.

Initial Flush Turbidity Test

A fluid filtration system is connected to a water supply and the first water through the filter was collected. The method is based on a comparison of the intensity of light scattered by the sample under defined conditions with the intensity of light scattered by a standard reference under the same conditions. A higher amount of scattered light indicates a higher level of turbidity in the water. The data are typically reported in Nephelometric Turbidity Units or NTU. Levels <0.5 NTU meet NSF/ANSI drinking water standards.

Figure 7:
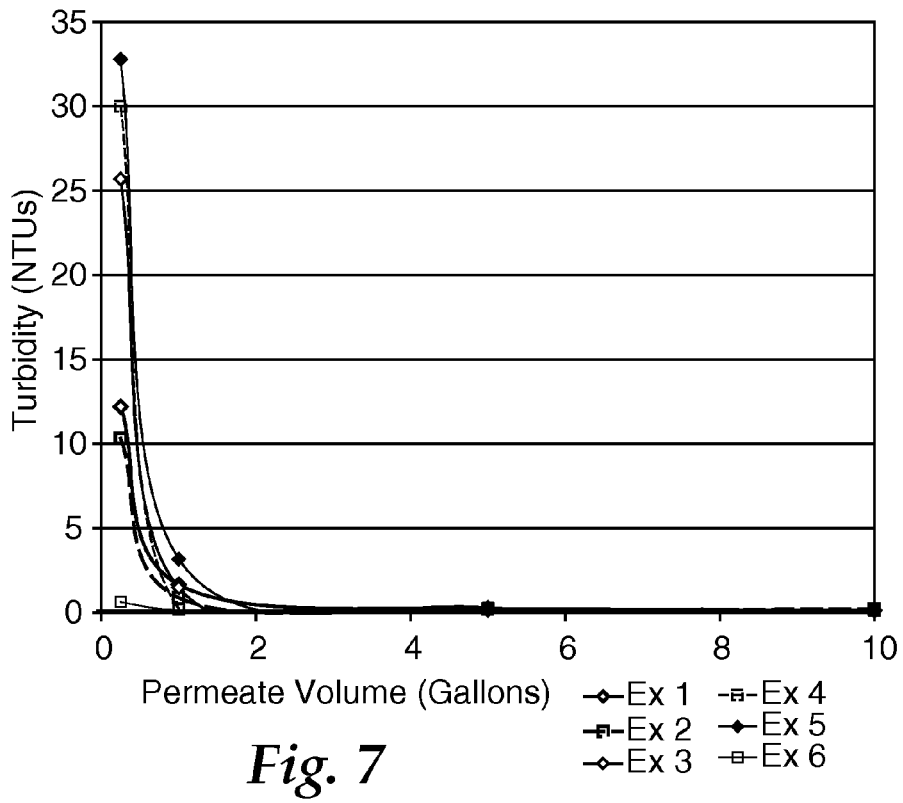
FIG. 7 is a graph showing turbidity as a function of permeate volume for exemplary fluid filtration article according to the present disclosure.
Figure 8:
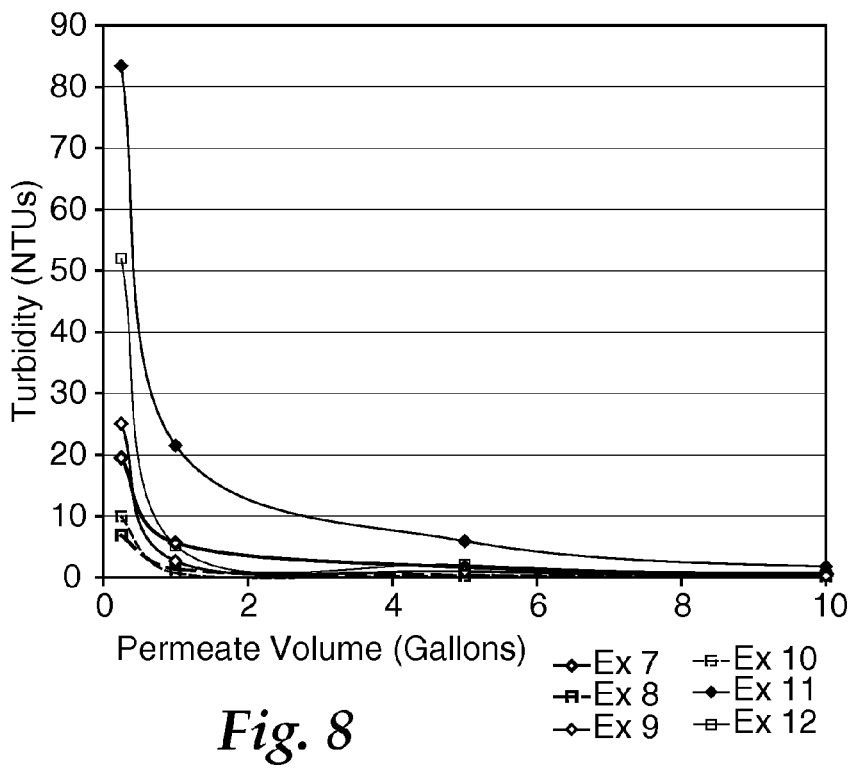
FIG. 8 is another graph showing turbidity as a function of permeate volume for exemplary fluid filtration article according to the present disclosure.
Figure 9:
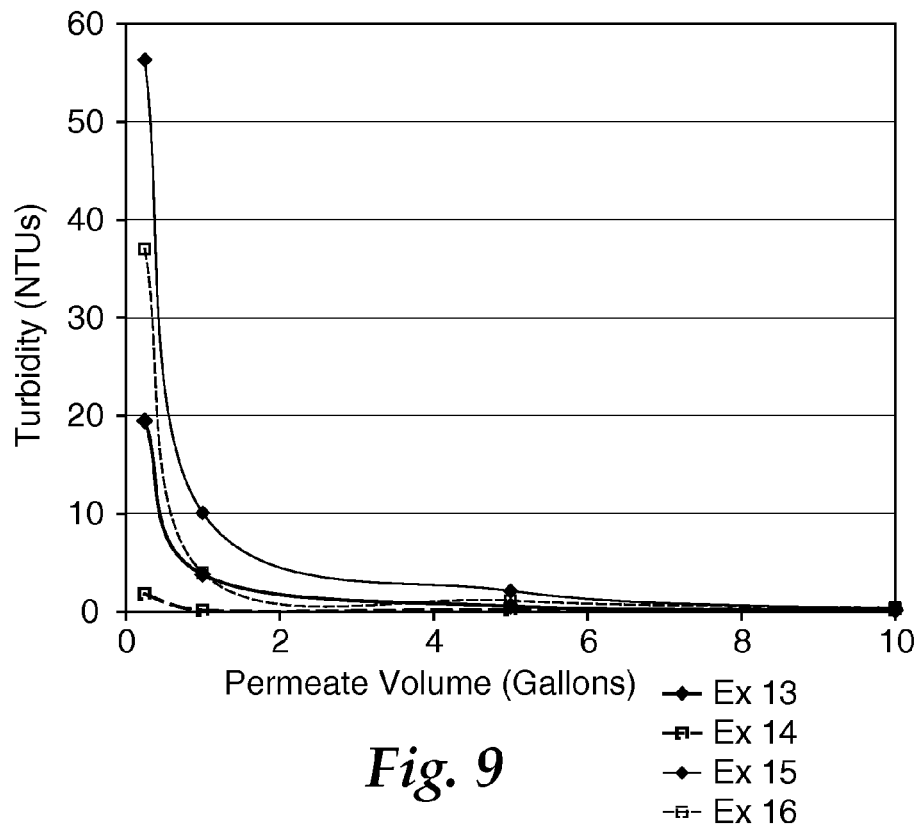
FIG. 9 is an additional graph showing turbidity as a function of permeate volume for exemplary fluid filtration article according to the present disclosure.

The fluid filtration articles according to Examples 1-26 were inserted into a housing that was modified with a John Guest connection that attached to the straw end of the end cap, such that the fluid (e.g., water) inlet was in fluid communication with the first (microfiber or coarse microfiber) overlayer, and the fluid outlet (e.g., water) was in fluid communication with the second (fine fiber) underlayer. The housing/filter structure was connected to a test stand flushed with water from the Eagan, Minnesota city water system. The first liter was collected from the effluent stream. The turbidity was measured and recorded. The samples were then allowed to flow at 0.75 gallons per minute (gpm) (about 2.92 liters/min) and additional samples were collected at 1, 5, 10, 25, 50 and 100 gallons (about 3.89, 19.46, 38.92, 97.3, 194.6, and 389 liters, respectively). The turbidity was measured at each sample point. The results for Examples 1-16 are plotted in FIGS. 7-9.

The results for Examples 17-26 are summarized in Table 3. As shown in Table 4, the clean pressure drop, calculated as the difference between the measured inlet pressure with a filtration element at a given flowrate and the measured inlet pressure without the filtration element at the same flowrate (i.e., the Control pressure listed in Table 4) of the filters of Examples 17-26 was low and such filters could be advantageous for whole house water filtration applications.

Scanning Electron Microscopy Analysis

Figure 10:
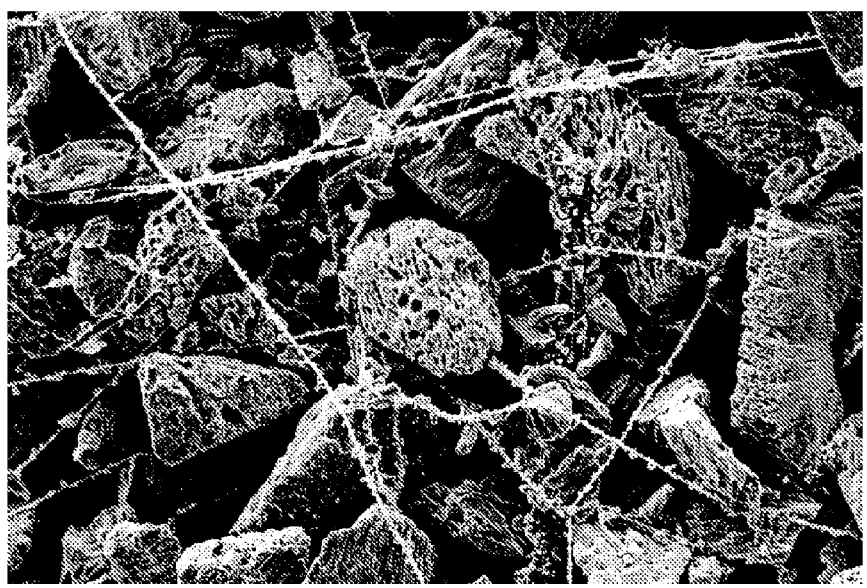
FIG. 10 is a scanning electron micrograph of a layer within an exemplary fluid filtration article according to the present disclosure.

Preparatory Example 8 (no sediment wrap) contained the finest (80×325) carbon size and has the highest probability to slough particles when used in a fluid filtration article. This fluid filtration article was analyzed using Scanning Electron Microscopy (SEM) to observe the size of the smallest carbon particles that were retained after the turbidity testing was completed. FIG. 10 illustrates one exemplary micrograph obtained from this analysis. Analysis of a series of micrographs showed that the smallest carbon particles (excluding debris) that were retained in the particle loaded fiber matrix were 62×45 μm. (A US 230 Tyler mesh sieve is reported to retain particles that are 63 μm and larger).

TABLE 3

| | TURBIDITY (NTUs) | | | | | | |
|---|---|---|---|---|---|---|---|
| Example Number | Permeate Volume 1 liter | Permeate Volume 1 gallon | Permeate Volume 5 gallons | Permeate Volume 10 gallons | Permeate Volume 20 gallons | Permeate Volume 50 gallons | Permeate Volume 100 gallons |
| 1 (Comparative) | 12.20 | 1.64 | 0.18 | 0.12 | 0.19 | 0.12 | 0.23 |
| 2 | 10.30 | 0.87 | 0.20 | 0.20 | 0.21 | 0.22 | 0.06 |
| 3 (Comparative) | 25.70 | 1.47 | 0.20 | 0.12 | 0.16 | 0.35 | 0.15 |
| 4 | 30.00 | 0.23 | 0.18 | 0.11 | 0.14 | 0.16 | 0.39 |
| 5 (Comparative) | 32.80 | 3.15 | 0.30 | 0.15 | 0.13 | 0.16 | 0.15 |
| 6 | 0.61 | 0.15 | 0.28 | 0.18 | 0.18 | 0.21 | 0.26 |
| 7 (Comparative) | 19.50 | 5.62 | 1.67 | 0.59 | 0.31 | 0.28 | 0.17 |
| 8 | 6.85 | 1.40 | 0.36 | 0.16 | 0.22 | 0.41 | 0.55 |
| 9 (Comparative) | 25.10 | 2.66 | 1.00 | 0.30 | 0.14 | 0.12 | 0.27 |
| 10 | 9.92 | 0.74 | 0.31 | 0.26 | 0.12 | 0.24 | 0.12 |
| 11 (Comparative) | 83.40 | 21.50 | 5.92 | 1.80 | 0.77 | 0.21 | 0.34 |
| 12 | 52.00 | 5.22 | 2.07 | 0.43 | 0.49 | 0.28 | 0.21 |
| 13 (Comparative) | 19.50 | 3.79 | 0.55 | 0.17 | 0.17 | 0.19 | 0.28 |
| 14 | 1.80 | 0.16 | 0.21 | 0.23 | 0.16 | 0.16 | 0.16 |
| 15 (Comparative) | 56.30 | 10.10 | 2.12 | 0.36 | 0.30 | 0.20 | 0.60 |
| 16 | 37.0 | 3.97 | 1.13 | 0.42 | 0.20 | 0.29 | 0.16 |
| 17 (Comparative) | 231 | 3.75 | 0.84 | 0.25 | 0.14 | 0.19 | 0.12 |
| 18 | 190 | 1.68 | 0.47 | 0.11 | 0.18 | 0.11 | 0.09 |
| 19 | 109 | 1.05 | 0.35 | 0.19 | 0.15 | 0.08 | 0.09 |
| 20 | 56.6 | 0.47 | 0.24 | 0.18 | 0.11 | 0.08 | 0.16 |
| 21 | 298 | 4.58 | 2.06 | 0.42 | 0.16 | 0.08 | 0.14 |
| 22 | 145 | 4.04 | 1.43 | 0.33 | 0.26 | 0.08 | 0.12 |
| 23 | 134 | 3.18 | 0.72 | 0.21 | 0.13 | 0.1 | 0.11 |
| 24 | 23.2 | 0.34 | 0.27 | 0.06 | 0.07 | 0.06 | 0.08 |
| 25 | 25.2 | 0.5 | 0.32 | 0.15 | 0.12 | 0.07 | 0.13 |
| 26 | 231 | 2.79 | 0.77 | 0.33 | 0.14 | 0.09 | 0.1 |

TABLE 4

| | 1 GPM = 3.39 liters/min | MEASURED PRSSURE & [PRESSURE DROP] (psi) | | | 1 psi = 6895 Pa |
|---|---|---|---|---|---|
| Example Number | Permeate Flowrate 0.25 GPM | Permeate Flowrate 0.50 GPM | Permeate Flowrate 0.75 GPM | Permeate Flowrate 1.00 GPM | Permeate Flowrate 2.00 GPM |
| CONTROL (NO ELEMENT) | 0 | 0 | 1 | 2 | 8 |
| 17 (Comparative) | 0 [0] | 0 [0] | 2.5 [1.5] | 3.5 [1.5] | 9 [1] |
| 18 | 0 [0] | 0 [0] | 2.5 [1.5] | 3.5 [1.5] | 9.5 [1.5] |
| 19 | 0 [0] | 0 [0] | 2 [1] | 4 [2] | 10 [2] |
| 20 | 0 [0] | 0 [0] | 3 [2] | 4 [2] | 10 [2] |
| 21 | 2 [2] | 2 [2] | 2 [1] | 3 [1] | 8 [0] |

TABLE 4-continued

| Example Number | Permeate Flowrate 0.25 GPM | Permeate Flowrate 0.50 GPM | MEASURED PRSSURE & [PRESSURE DROP] (psi) Permeate Flowrate 0.75 GPM | Permeate Flowrate 1.00 GPM | Permeate Flowrate 2.00 GPM |
|---|---|---|---|---|---|
| | | | 1 GPM = 3.39 liters/min | | 1 psi = 6895 Pa |
| 22 | 2 [2] | 2 [2] | 2.5 [1.5] | 3.5 [1.5] | 8.5 [0.5] |
| 23 | 2 [2] | 2 [2] | 2.5 [1.5] | 3.5 [1.5] | 9 [1] |
| 24 | 2.5 [2.5] | 3 [3] | 3.5 [2.5] | 5.5 [3.5] | 14 [6] |
| 25 | 2.5 [2.5] | 4 [4] | 7 [6] | 10 [8] | 22 [14] |
| 26 | 2 [2] | 2 [2] | 2.5 [1.5] | 3.5 [1.5] | 9 [1] |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g. 1 to 5 includes 1, 1.5, 2, 2.75, 3, 3.80, 4, and 5). In addition, all numbers used herein are assumed to be modified by the term 'about'. Various exemplary embodiments have been described. These and other embodiments are within the scope of the following claims.

The invention claimed is:

1. A fluid filtration medium comprising:
   a population of microfibers having a population median diameter of at least 1 μm formed as a first layer; and
   a population of sub-micrometer fibers having a population median diameter less than one micrometer (μm) formed as a second layer adjoining the first layer,
   wherein at least one of the fiber populations is molecularly oriented.

2. The fluid filtration medium of claim 1, wherein the population of microfibers has a population median fiber diameter ranging from about 2 μm to about 100 μm, and wherein the population of sub-micrometer fibers has a population median fiber diameter ranging from about 0.2 μm to about 0.9 μm.

3. The fluid filtration medium of claim 1, wherein at least one of the population of sub-micrometer fibers and the population of microfibers comprises polymeric fibers, optionally wherein the polymeric fibers comprise polypropylene, polyethylene, polyester, polyethylene terephthalate, polybutylene terephthalate, polyamide, polyurethane, polybutene, polylactic acid, polyvinyl alcohol, polyphenylene sulfide, polysulfone, fluid crystalline polymer, polyethylene-co-vinylacetate, polyacrylonitrile, cyclic polyolefin, polyoxymethylene, polyolefinic thermoplastic elastomers, or a combination thereof.

4. The fluid filtration medium of claim 1, wherein the first layer overlays the second layer.

5. The fluid filtration medium of claim 4, wherein the second layer is pleated.

6. The fluid filtration medium of claim 1, further comprising a porous support layer.

7. The fluid filtration medium of claim 6, wherein the porous support layer adjoins the second layer opposite the first layer.

8. The fluid filtration medium of claim 6, wherein the porous support layer adjoins the first layer opposite the second layer.

9. The fluid filtration medium of claim 6, wherein the porous support layer comprises a nonwoven fabric, a woven fabric, a knitted fabric, a foam layer, a screen, a porous film, a perforated film, an array of filaments, or a combination thereof.

10. The fluid filtration medium of claim 6, wherein the porous support layer comprises a web of bonded staple fibers, further wherein the porous support layer is bonded using thermal bonding, adhesive bonding, powdered binder, hydroentangling, needlepunching, calendering, or a combination thereof.

11. The fluid filtration medium of claim 6, wherein the porous support layer comprises microfibers, optionally wherein the microfibers forming the porous support layer are compositionally the same as the population of microfibers that forms the first layer.

12. The fluid filtration medium of claim 1, wherein at least one of the first layer and the second layer further comprises a plurality of particulates, optionally wherein the plurality of particulates is selected from the group consisting of an absorbent, an adsorbent, activated carbon, an anion exchange resin, a cation exchange resin, a molecular sieve, or a combination thereof.

13. The fluid filtration medium of claim 12, wherein at least one of the first layer and the second layer exhibits a gradient of fiber population median diameter, a gradient of particulate population mean diameter, a gradient of particulate concentration, or a combination thereof.

14. The fluid filtration medium of claim 1, wherein the first layer and the second layer are arranged into a stack on a porous support, further wherein the first layer adjoins the porous support.

15. The fluid filtration medium of claim 1, wherein the first layer and the second layer are wound into a three-dimensional geometric shape having a hollow core, wherein the second layer forms an inner layer adjacent to the hollow core, and the first layer forms an outer layer distal from the hollow core.

16. A method of using the fluid filtration medium of claim 1, comprising passing a permeating fluid through the fluid filtration medium, wherein the permeating fluid passes through the first layer before passing through the second layer.

17. A method of using the fluid filtration medium of claim 1, comprising passing a permeating fluid through the fluid filtration medium, wherein the second layer is pleated, and wherein the permeating fluid passes through the second layer before passing through the first layer.

18. A method of making a fluid filtration medium, comprising:

a. forming a first layer comprising a population of microfibers having a population median fiber diameter of at least 1 μm; and
b. forming a second layer impinging on the first layer, the second layer comprising a population of sub-micrometer fibers having a population median fiber diameter of less than 1 μm, wherein at least one of the fiber populations is molecularly oriented.

19. The method of claim 18, further comprising forming a region between the first layer and the second layer wherein at least a portion of the population of microfibers is intermixed with at least a portion of the population of sub-micrometer fibers.

20. The method of claim 18, further comprising adding a porous support layer adjoining the second layer opposite the first layer, optionally wherein the porous support layer comprises a web of bonded staple fibers, where the porous support layer is bonded using thermal bonding, adhesive bonding, powdered binder, hydroentangling, needlepunching, calendering, or a combination thereof.

21. The method of claim 18, wherein forming a population of sub-micrometer fibers having a median fiber diameter of less than 1 μm comprises melt blowing, melt spinning, electrospinning, plexifilament formation, gas jet fibrillation, or a combination thereof.

22. The method of claim 18, wherein forming a population of microfibers having a median fiber diameter of at least 1 μm comprises melt blowing, melt spinning, filament extrusion, plexifilament formation, or a combination thereof.

23. The method of claim 18, wherein combining the sub-micrometer and microfibers comprises mixing fiber streams, hydroentangling, wet forming, plexifilament formation, or a combination thereof.

24. A composite nonwoven fibrous article comprising:
a population of coarse polymeric microfibers having a population median diameter of at least 1 μm formed as a first layer; and
a population of fine polymeric microfibers having a population median diameter less than 10 μm formed as a second layer adjoining the first layer,
wherein at least one of the fiber populations is molecularly oriented.

25. The article of claim 24, wherein the population of fine microfibers comprises a population of sub-micrometer fibers having a population median diameter less than 1 μm.

26. The article of claim 24, wherein the first layer further comprises a plurality of particulates, optionally wherein the plurality of particulates is selected from the group consisting of an absorbent, an adsorbent, activated carbon, an anion exchange resin, a cation exchange resin, a molecular sieve, or a combination thereof.

27. A method of making the article of claim 24, comprising:
a. forming the first layer comprising the population of coarse polymeric microfibers having a population median fiber diameter of at least 1 μm;
b. forming the second layer comprising the population of fine polymeric microfibers having a population median fiber diameter of less than 10 μm;
c. molecularly orienting one or both of the first and second layer; and
d. optionally bonding the first layer to the second layer.

28. A fluid filtration article comprising:
a population of microfibers having a population median diameter of at least 1 μm formed as a first layer;
a population of ultrafine microfibers having a population median diameter less than 2 μm formed as a second layer adjoining the first layer, wherein at least one of the fiber populations is molecularly oriented; and
a fluid-impermeable housing surrounding the first and second layers, wherein the housing comprises at least one fluid inlet in fluid communication with the first layer, and at least one fluid outlet in fluid communication with the second layer.

* * * * *